United States Patent
Hoffman

(10) Patent No.: US 10,233,064 B2
(45) Date of Patent: *Mar. 19, 2019

(54) AUTOMATED LOAD HANDLING FOR INDUSTRIAL VEHICLE

(71) Applicant: Hyster-Yale Group, Inc., Fairview, OR (US)

(72) Inventor: Matthew K. Hoffman, Greenville, NC (US)

(73) Assignee: HYSTER-YALE GROUP, INC., Fairview, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/629,433

(22) Filed: Jun. 21, 2017

(65) Prior Publication Data
US 2018/0009643 A1 Jan. 11, 2018

Related U.S. Application Data

(63) Continuation-in-part of application No. 15/203,681, filed on Jul. 6, 2016, now Pat. No. 9,718,661.

(51) Int. Cl.
*B62B 3/06* (2006.01)
*B62B 5/00* (2006.01)
*B66F 9/24* (2006.01)

(52) U.S. Cl.
CPC ............ *B66F 9/24* (2013.01); *B62B 3/0612* (2013.01); *B62B 5/0069* (2013.01);
(Continued)

(58) Field of Classification Search
CPC ........... B66F 9/24; B62B 3/06; B62B 3/0612
See application file for complete search history.

(56) References Cited

U.S. PATENT DOCUMENTS 3,243,062 A * 3/1966 Frassetto ............... B60P 1/52
    193/35 MD
3,258,145 A * 6/1966 Costello ............... B66F 9/06
    414/607

(Continued)

FOREIGN PATENT DOCUMENTS

DE         20014472 U1    5/2001
DE    102013202093 A1    8/2014
(Continued)

*Primary Examiner* — Behrang Badii
*Assistant Examiner* — Daniel L Greene
(74) *Attorney, Agent, or Firm* — Schwabe Williamson & Wyatt

(57) ABSTRACT

A load handling system for a vehicle includes a set of forks that concurrently supports two or more pallets including a first pallet and a second pallet linearly positioned along a length of the forks, and a lifting system to raise and lower the forks. A traction system moves the vehicle in a direction of travel associated with withdrawing the forks from the pallets. Additionally, an actuation device generates an activation signal in response to being actuated by an operator, and a vehicle controller places the vehicle in an automated mode of operation in response to receiving the activation signal. In the automated mode of operation, a front end of the forks moves from the second pallet to the first pallet, and the first pallet is raised while the second pallet remains on a transport surface. The first pallet is then spaced apart from the second pallet by a predetermined distance and then lowered to the transport surface.

20 Claims, 23 Drawing Sheets

(52) U.S. Cl.
CPC ........ *B62B 5/0076* (2013.01); *B62B 2203/28* (2013.01); *B62B 2203/29* (2013.01)

(56) References Cited

U.S. PATENT DOCUMENTS

| | | | |
|---|---|---|---|
| 4,601,480 A | | 7/1986 | Arwidsson |
| 5,139,385 A | * | 8/1992 | Chase ................ B66F 9/144 |
| | | | 414/667 |
| 5,938,710 A | | 8/1999 | Lanza |
| 6,260,719 B1 | * | 7/2001 | Azzopardi ............ B65G 1/02 |
| | | | 211/189 |
| D632,812 S | | 2/2011 | Matsumoto |
| D717,977 S | | 11/2014 | Platto |
| D718,479 S | | 11/2014 | Lai |
| 9,561,941 B1 | | 2/2017 | Watts |
| 2006/0287759 A1 | * | 12/2006 | Charych ............ B66F 9/0755 |
| | | | 700/213 |
| 2007/0237612 A1 | | 10/2007 | Mammome |
| 2007/0269299 A1 | | 11/2007 | Ross |
| 2009/0260923 A1 | | 10/2009 | Baldini |
| 2012/0123614 A1 | | 5/2012 | Laws |
| 2012/0126000 A1 | | 5/2012 | Kunzig |
| 2012/0191272 A1 | | 7/2012 | Andersen |
| 2012/0207576 A1 | | 8/2012 | Kraft |
| 2013/0197760 A1 | | 8/2013 | Castaneda |
| 2014/0195127 A1 | | 7/2014 | Hoffman |
| 2015/0213695 A1 | | 7/2015 | Carlson |

FOREIGN PATENT DOCUMENTS

| | | | |
|---|---|---|---|
| EP | 933281 | A1 | 8/1999 |
| EP | 2100831 | A1 | 9/2009 |
| EP | 2765101 | A1 | 8/2014 |

* cited by examiner

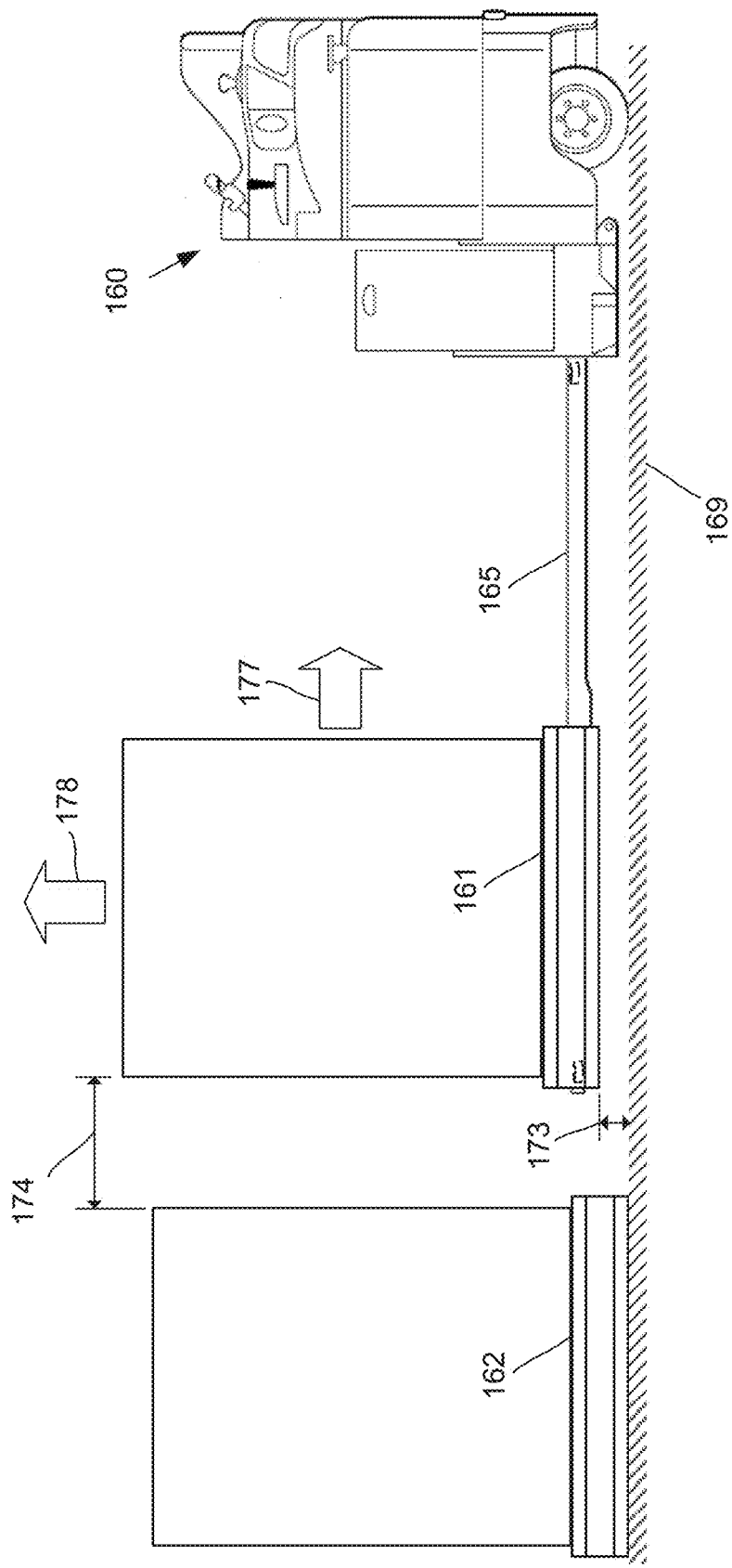

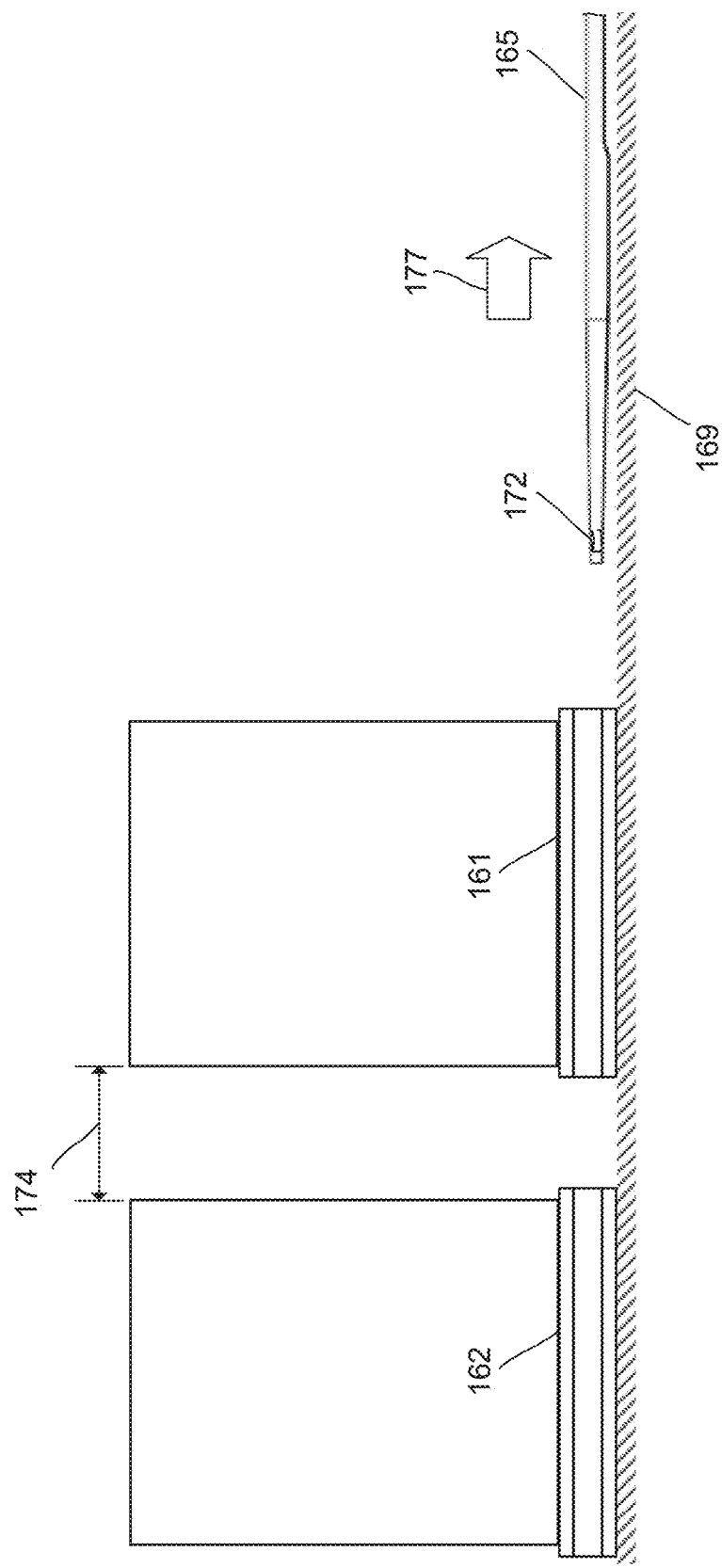

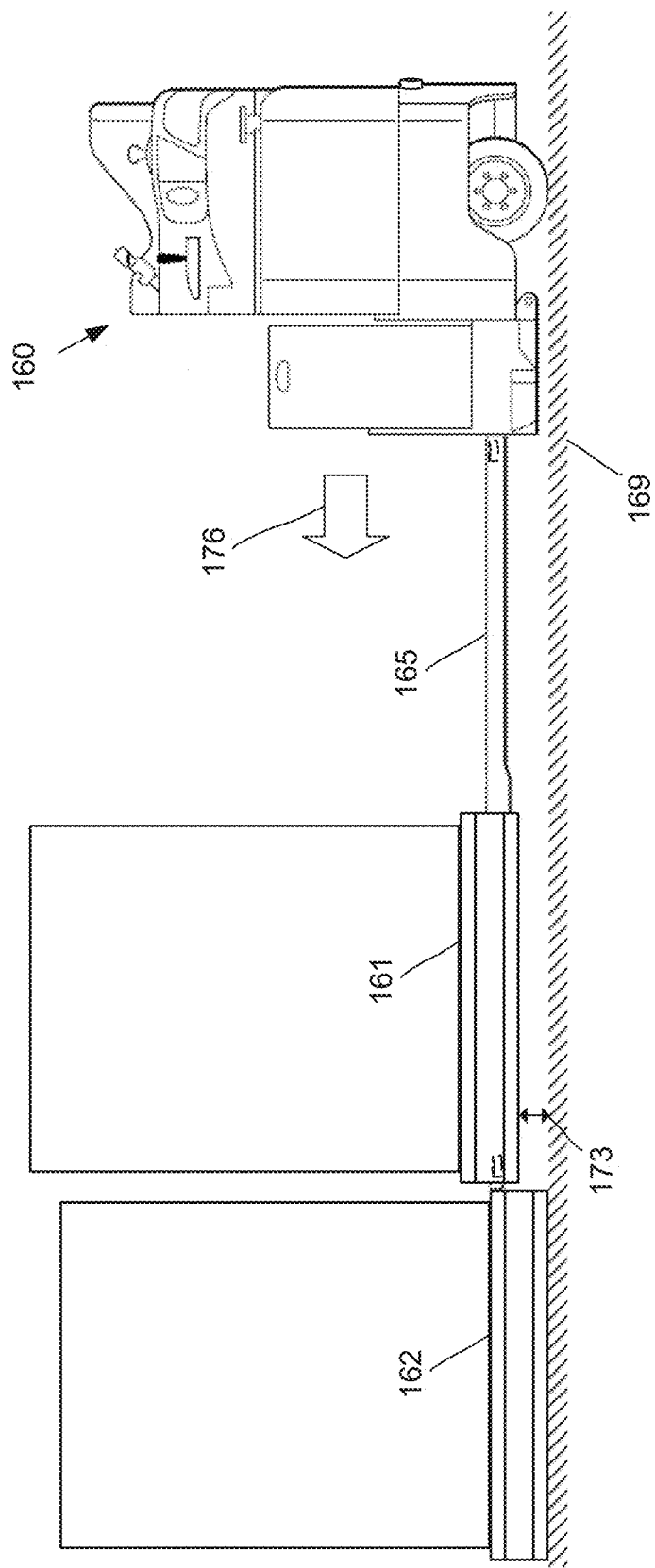

AUTOMATED LOAD HANDLING FOR INDUSTRIAL VEHICLE

CROSS REFERENCE TO RELATED APPLICATIONS

This application is a Continuation in Part of U.S. patent application Ser. No. 15/203,681, filed on Jul. 6, 2016, now pending, the disclosure of which is herein incorporated by reference in its entirety.

TECHNICAL FIELD

This application relates to the field of industrial powered vehicles configured to transport goods and materials.

BACKGROUND

Industrial vehicles by design may be used for a wide range of uses, duty cycles, and applications. In some operating conditions, industrial vehicles may be infrequently used to transport materials only when needed, e.g., in response to the occasional received shipment of goods. In other types of operating conditions, industrial vehicles may be used nearly around the clock in multiple shifts, with the only substantial down-time occurring during routine or required maintenance.

Operators of pallet trucks and other types of industrial vehicles are many times paid on incentive, such that any feature that will simplify the operation of the truck or provide functionality that increases productivity may benefit not only the operators but also the associated businesses.

Control handles for walk behind pallet trucks have been ergonomically optimized to facilitate an operator's control of the pallet truck and to reduce operator fatigue. Operators commonly operate a pallet truck having a typical control handle to lift a pallet by maneuvering the forks of the pallet truck into position underneath or within the pallet. A lift actuator is then engaged to lift the pallet off the ground, commonly an initial small distance. The pallet truck operator checks to ensure there is no on-coming traffic or other obstacles that could be hit by moving the pallet and pallet truck. The lift actuator is again engaged to fully raise the pallet. After lifting, the operator engages a traction actuator to begin moving the pallet truck and pallet.

In certain types of work environments or applications, the operator may manually operate the vehicle in a number of sequential steps, as described above in the example lift and move sequence, as well as other operations. However, in some work environments a sequential series of steps may be viewed as requiring additional time and effort to accomplish a particular task, thereby reducing productivity.

Known load handling systems may consist of automated operations which may include removing goods from shelves when an order has been placed. For example, an automated load handling vehicle may be programmed to transport the goods through a warehouse and thereby reduce the amount of time that a human operator would otherwise need to operate the vehicle. While automated load handling systems continue to improve in performance and capabilities, there nevertheless remain a substantial number of operations and/or operating conditions in which a human operator or worker may more efficiently perform the related tasks.

Other than operational settings or programming which may be configured prior to operation of the automated vehicle, known automated load handling vehicles may have limited capability to interact with human operators. Accordingly, this limited ability to interact or communicate may result in an inefficient transition between operations that may be performed automatically to those operations that may be more efficiently performed manually by an operator.

Known industrial vehicles are typically equipped with a horn that the operator may press to communicate with other operators and pedestrians in a work environment which may include a relatively high ambient noise. Some vehicles may also include a back-up alert or operating lights to assist in communicating the presence and/or intention of the vehicle. However, the different types of work environments and operating conditions in which the vehicle operates may affect the effectiveness of known audible and visual systems to alert other vehicles or pedestrians.

This application addresses these and other problems.

SUMMARY

A load handling system for a vehicle is disclosed herein. In one or more disclosed embodiments, the load handling system comprises a set of forks configured to concurrently support two or more pallets including a first pallet and a second pallet linearly positioned along a length of the forks, and a lifting system configured to raise and lower the forks. Additionally, a traction system may be configured to move the vehicle in a direction of travel associated with withdrawing the forks from the pallets. An actuation device may be configured to generate an activation signal in response to being actuated by an operator, and a vehicle controller may be configured to place the vehicle in an automated mode of operation in response to receiving the activation signal.

During the automated mode of operation, the vehicle controller may be configured to actuate the traction system a first time to move the vehicle in the direction of travel so that a front end of the forks moves from being under the second pallet to being under the first pallet, and then actuate the lifting system to raise the first pallet supported on the front end of the forks while the second pallet remains on a transport surface. Additionally, the vehicle controller may be configured to actuate the traction system a second time to move the vehicle in the direction of travel so that the first pallet is spaced apart from the second pallet by a predetermined distance, and then actuate the lifting system to lower the first pallet to the transport surface at the predetermined distance from the second pallet.

A method of performing a load handling operation for a vehicle is disclosed herein. In one or more disclosed embodiments, the vehicle may have a set of forks configured to concurrently support both a first pallet and a second pallet linearly positioned along a length of the forks, a lifting system configured to raise and lower the forks, and a traction system configured to move the vehicle in a first direction of travel associated with withdrawing the forks from pallets.

The method may comprise receiving, by a vehicle controller, an activation signal from an operator enabled actuation device, and placing the vehicle in an automated mode of operation based, at least in part, on the activation signal. The method may further comprise actuating the traction system during the automated mode of operation to move the vehicle in the direction of travel so that a front end of the forks moves from being under the second pallet to being under the first pallet, and then actuating the lifting system during the automated mode of operation to raise the first pallet supported on the front end of the forks while the second pallet remains on a transport surface. The traction system may again be actuated during the automated mode of operation to move the vehicle in the direction of travel so that the first pallet is spaced apart from the second pallet by a predetermined distance, and then the lifting system may be actuated during the automated mode of operation to lower the first pallet to the transport surface at the predetermined distance from the second pallet.

A further method of performing a load handling operation for a vehicle is disclosed herein. In one or more disclosed embodiments, the method may comprise receiving, by a vehicle controller, an activation signal from an operator enabled actuation device when a first pallet is located on a transport surface at a predetermined distance from a second pallet, and placing the vehicle in, or resuming, an automated mode of operation based, at least in part, on the activation signal. The method may further comprise actuating the lifting system during the automated mode of operation to raise the first pallet supported on the end of the forks from the transport surface. The first pallet may be laterally spaced apart from the second pallet by the predetermined distance.

The traction system may be actuated to move the vehicle in a second direction of travel, opposite the first direction of travel, so that the first pallet is moved towards the second pallet by the predetermined distance, and the lifting system may be actuated during the automated mode of operation to lower the first pallet to the transport surface so that the first pallet is located next to the second pallet on the transport surface. Additionally, the traction system may be actuated during the automated mode of operation to move the vehicle in the second direction of travel so that the front end of the forks moves from being under the first pallet to being under the second pallet.

BRIEF DESCRIPTION OF THE DRAWINGS

FIGS. 6A-6D illustrate an example automated mode of operating an industrial vehicle comprising forks configured to transport two or more pallets.

FIGS. 7A-7D illustrate a further example automated mode of operating an industrial vehicle.

DETAILED DESCRIPTION

Figure 1:
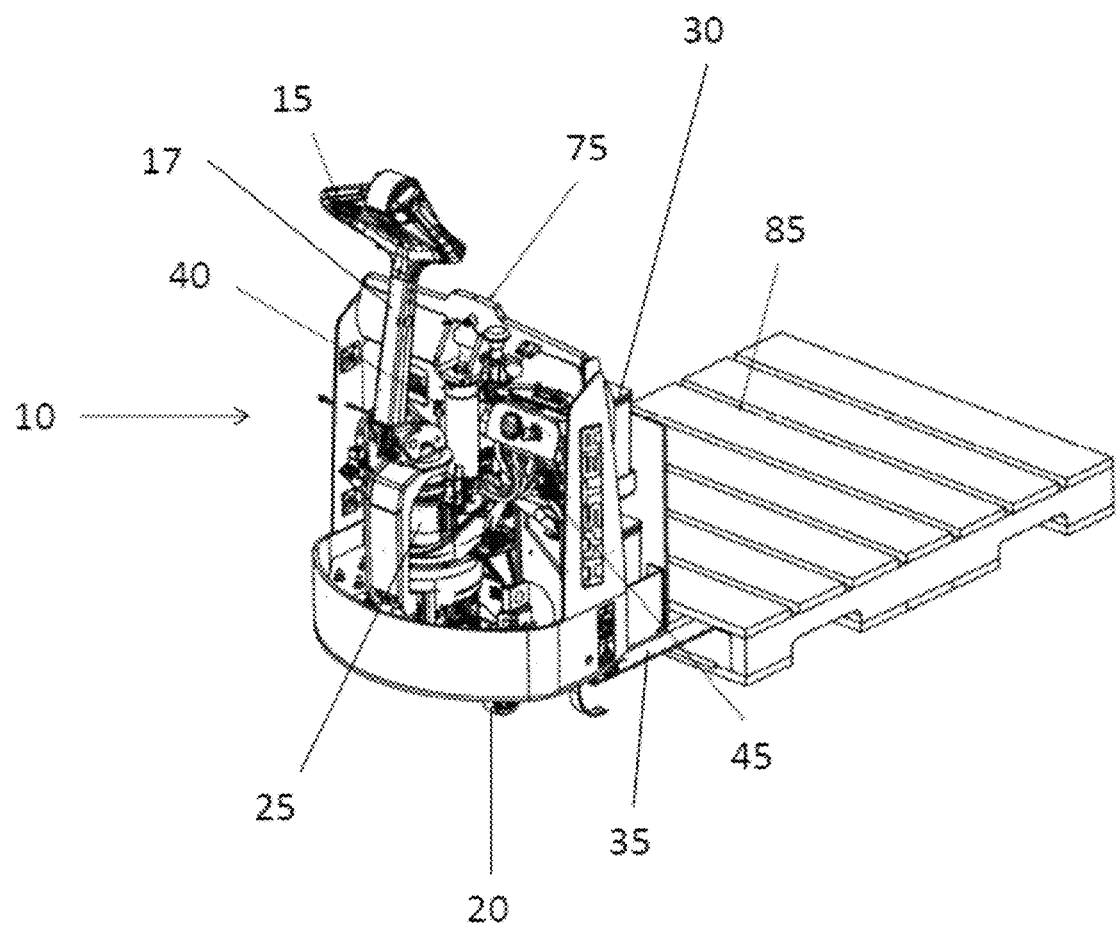
FIG. 1 illustrates a front right isometric view of an example pallet truck with its cover removed.

FIG. 1 illustrates a front right isometric view of an example pallet truck 10 with its cover removed. Pallet truck 10 may be referred to as a "walkie" style pallet truck. Pallet truck 10 includes a control handle 15 that is attached to a steering arm 17 that may be rotated to cause rotation of drive wheel 20 and thus control the direction of travel of pallet truck 10. The pallet truck 10 is moved by a traction motor 25 that is energized by a battery 30. A pair of forks 35 may be raised and lowered via a hydraulic cylinder 40. An electronic controller 45 communicates with lift, lower and traction actuators and implements activation of the traction motor 25 and of the hydraulic cylinder 40 in response to receiving commands from the lift, lower and traction actuators.

Figure 2:
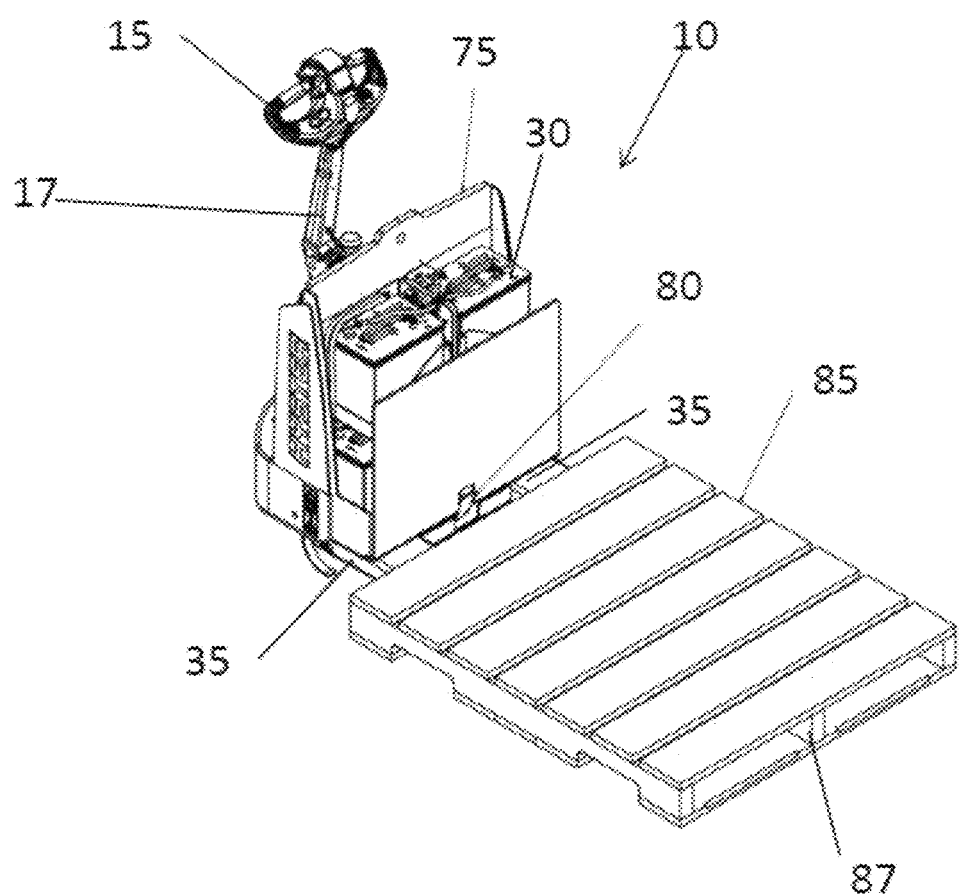
FIG. 2 illustrates a rear right isometric view of the example pallet truck of FIG. 1.

FIG. 2 illustrates a rear right isometric view of the example pallet truck 10 of FIG. 1. An optional second lift actuator is included on the frame 75 of pallet truck 10, however the second lift actuator may be attached to any suitable portion of pallet truck 10, including the forks 35. In some examples, the second lift actuator may comprise a switch 80. In other examples, the second lift actuator may comprise a sensor, such as an optical sensor, other switches, or other suitable devices. An operator maneuvers the forks 35 into or underneath a load, such as pallet 85. Pallet truck 10 is moved toward pallet 85 until a portion of pallet 85, such as a center stringer 87, activates switch 80.

Figure 3:
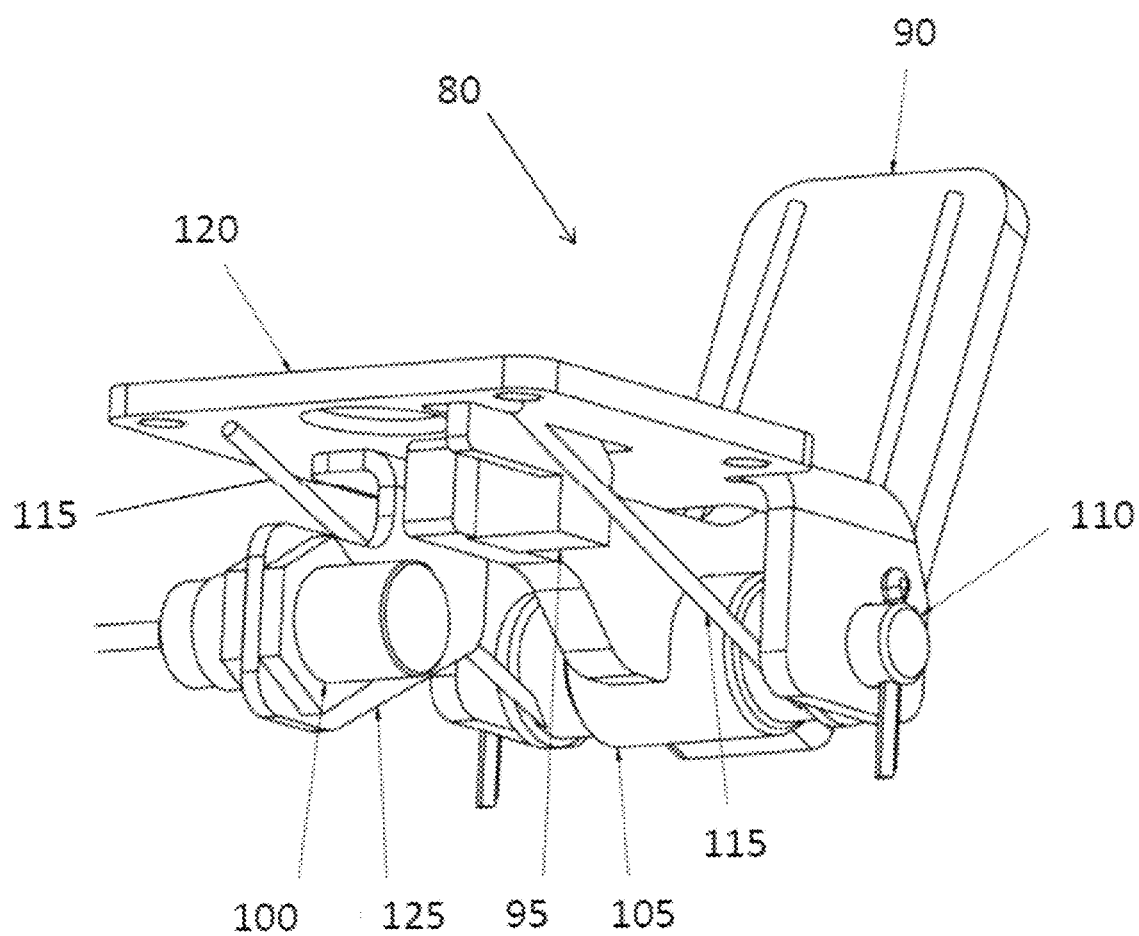
FIG. 3 illustrates a front right isometric view of an example switch.

FIG. 3 illustrates a front right isometric view of an example switch 80. A portion of the pallet 85 (FIG. 2) may contact and move an activation paddle 90 of switch 80 a sufficient distance for an activation arm 95 to trigger a proximity sensor 100. Proximity sensor 100 may include a capacitive, Doppler, eddy-current, inductive, magnetic, laser, photocell, ultrasonic or other suitable sensing device for sensing when activation arm 95 is proximate proximity sensor 100.

The activation arm 95 may be rigidly connected to the activation paddle 90. In some examples, activation arm may be made integral with activation paddle 90, or otherwise suitably connected to move when activation paddle 90 moves. A swivel 105 permits the activation paddle 90 and the activation arm 95 to rotate around a pivot pin 110. Return springs 115 cause activation paddle 90 and activation arm 95 to move to a position where proximity sensor 100 is not triggered, such as when pallet truck 10 moves away from pallet 85. A base 120 supports pivot pin 110, and thus activation paddle 90 and activation arm 95, as well as a proximity switch holder 125. Base 120 may be rigidly connected to frame 75 (FIG. 2).

Figure 4:
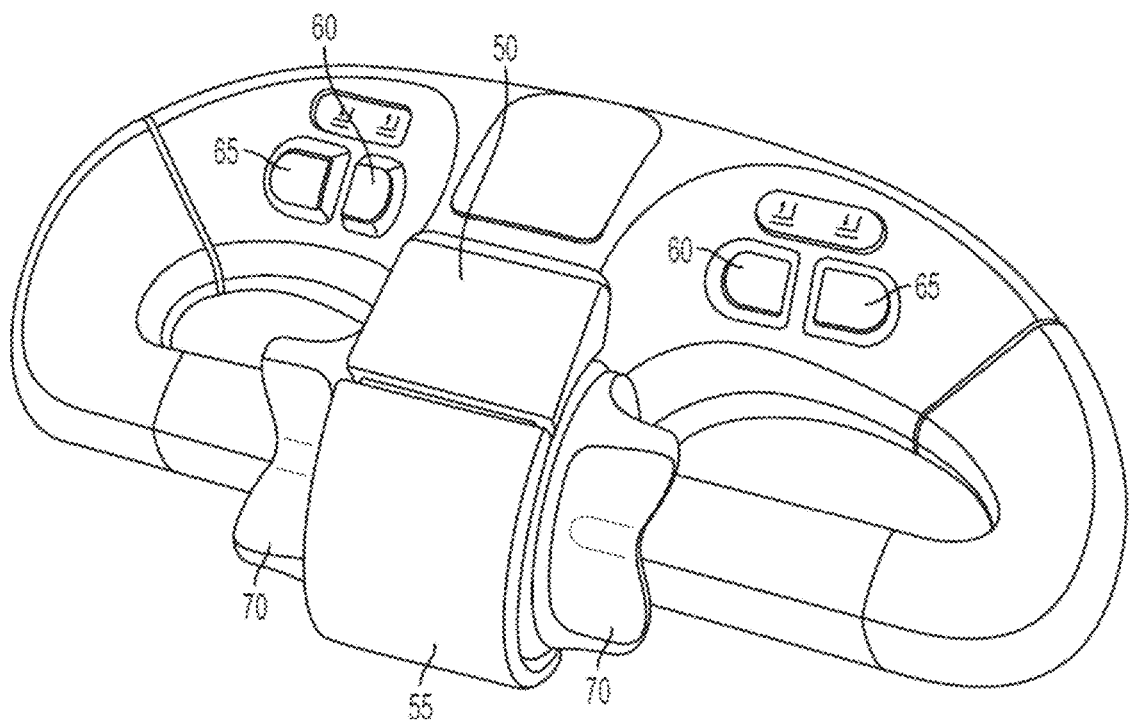
FIG. 4 illustrates a front right isometric view of an example control handle.

FIG. 4 illustrates a front right isometric view of an example control handle 15. In some examples, control handle 13 may be associated with a "walkie" style pallet truck. The control handle 15 includes a horn button 50, an emergency reverse button 55, a lift actuator, such as two lift buttons 60, a lower actuator, such as two lower buttons 65, and a traction actuator, such as two rotatable thumb wheels 70 that may be rotated away from the operator, to cause the pallet truck 10 to move away from the operator, or may be rotated towards the operator, to cause the pallet truck 10 to move towards the operator. Other suitable actuators may be used in place of those illustrated in FIG. 4. The two sets of lift buttons 60, lower buttons 65, and rotatable thumb wheels 70 may be provided to facilitate operation by either a left or right handed operator.

Control handle 15 may be configured to provide automated load handling of pallet truck 10 (FIG. 1), as described in more detail below. In some examples, the operator may actuate or press an operator control (e.g. traction actuator 70) twice in succession, similar to a "double-click" on a computer mouse, in order to engage the automated load handling operation.

Figure 5B:
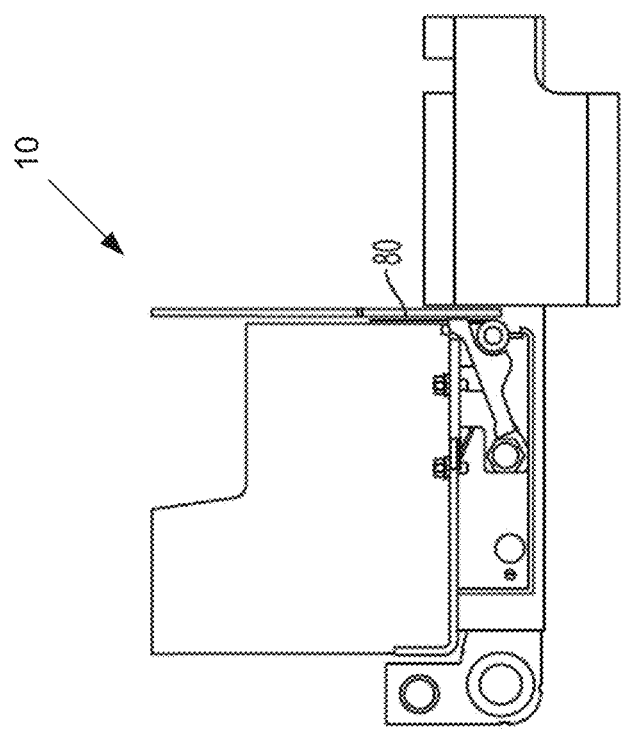
FIGS. 5A-5B illustrate a right side sectional view of the example pallet truck of FIG. 1 receiving a pallet and triggering the switch of FIG. 3.
Figure 5A:
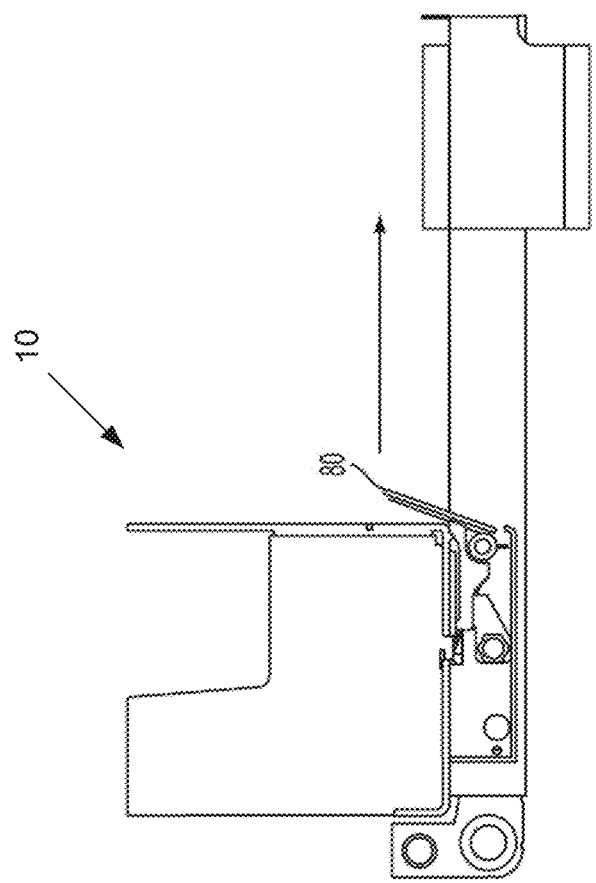

FIGS. 5A-5B illustrate a right side sectional view of the example pallet truck 10 of FIG. 1 receiving a pallet and triggering the switch 80 of FIG. 3. When proximity sensor 100 (FIG. 3) detects the presence of the activation arm 95 and is thus triggered, a pallet detection signal may be sent to electronic controller 45 (FIG. 4). The detection signal may indicate that the pallet has been fully engaged by the forks, the pallet is properly positioned on the forks, the pallet truck is not overloaded, the load is approximately evenly distributed on the forks, other lifting and/or transport criteria have been met, or any combination thereof.

When the operator is ready to raise and move the pallet, the operator may engage the traction actuator, for example, by rotating one of the two rotatable thumb wheels 70 (FIG. 4). The traction actuator sends a traction command to electronic controller 45 (FIG. 1) which may be programmed, hardwired, or otherwise suitably configured, to energize the traction motor in response to receiving the traction command.

FIGS. 6A-6D illustrate an example automated mode of operating an industrial vehicle 160 comprising forks 165 configured to transport two or more pallets, including a first pallet 161 and a second pallet 162. Forks 165 may comprise extra-long forks that are as long as the combined length of two or more pallets. For example, the length of forks 165 may be sized to accommodate three pallets positioned lengthwise on the forks 165. In some examples, each of FIGS. 6A-6D may be understood as illustrating automated sequential steps of a load handling operation, such as separating two or more loaded pallets.

Figure 6A:
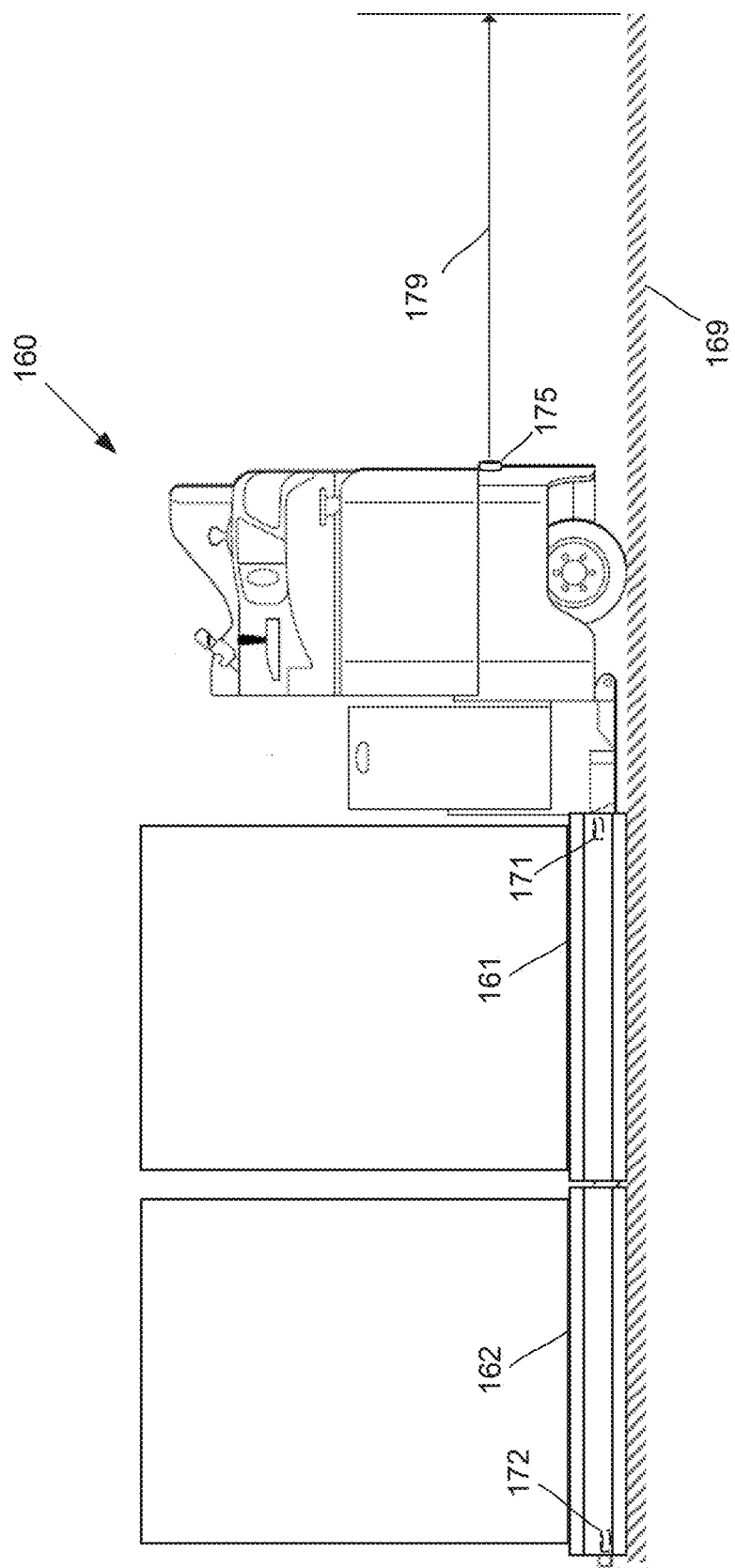
Figure 6B:
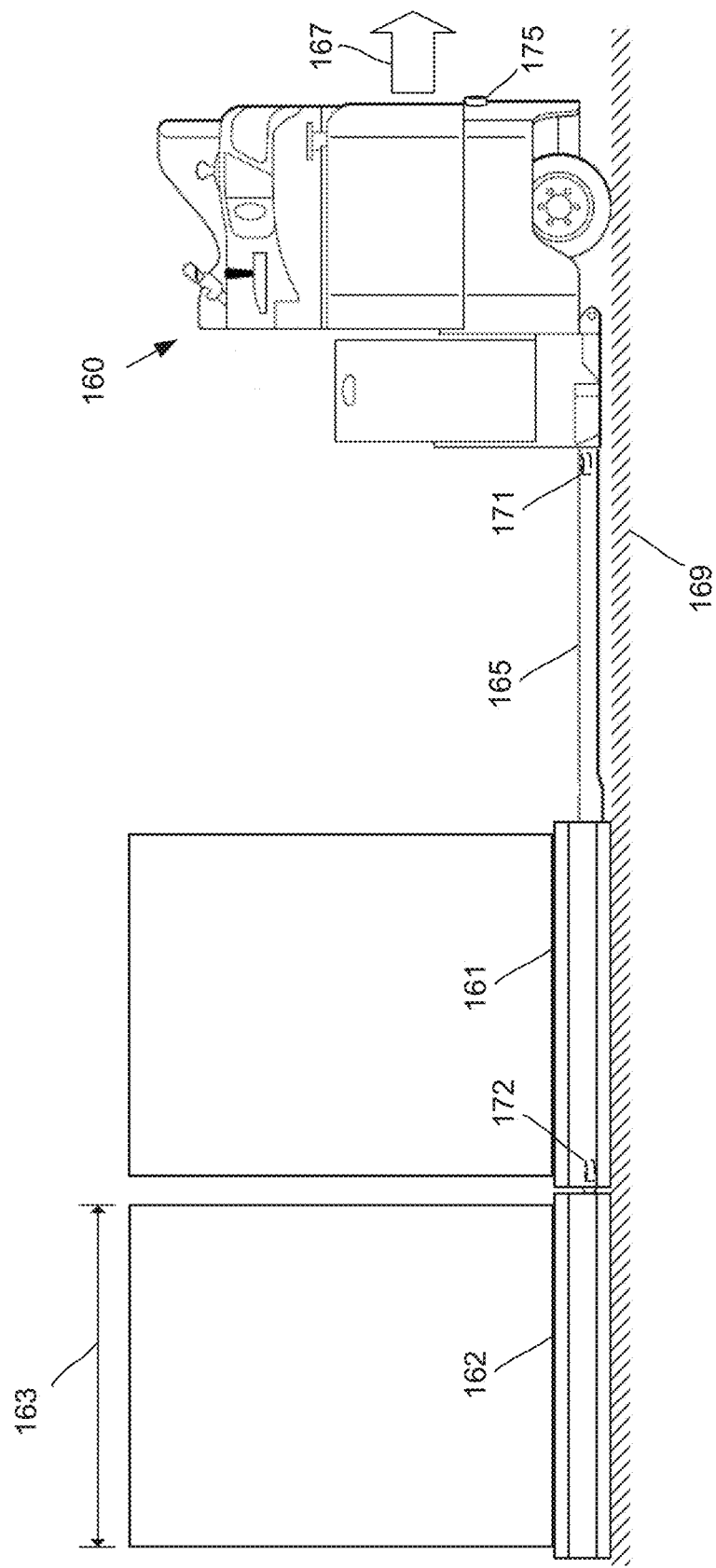

At FIG. 6A, two loaded pallets, including first pallet 161 and second pallet 162, are shown located on forks 165 (FIG. 6B). In some examples, vehicle 160 may be operated in an order picking mode, in which two or more empty pallets may initially be placed on the forks 165 and then loaded with goods by an operator walking alongside the vehicle 160. Accordingly, the vehicle 160 illustrated in FIG. 6A may be understood to be at the end of an order picking operation.

First pallet 161 may be located adjacent the frame or backrest of vehicle 160. In some examples, a first sensor 171 may be configured to detect the presence of first pallet 161. First sensor 171 may be located within the forks 165. In other examples, first sensor 171 may be located in the battery box, load backrest, or vehicle frame, similar to sensor 80 (FIG. 2). Second pallet 162 may be loaded on the forks 165 adjacent to first pallet 161. In some examples, a second sensor 172 may be configured to detect the presence of second pallet 162.

Vehicle 160 may be equipped with one or more additional sensors, such as a vehicle sensor 175, which may be configured to detect the presence of obstacles, the presence of pedestrians, the presence of the operator, the presence of a rack, the presence of other vehicles, other types of environmental sensory information, or any combination thereof. Vehicle sensor 175 may be configured to confirm that there are no obstacles or objects located immediately in front of, or behind, vehicle 160 prior to moving in the direction opposite the forks 165. A vehicle controller may be configured to disable the automated mode of operation in response to receiving a signal from vehicle sensor 175.

In some examples, vehicle sensor 175 may be configured to detect a distance 179 or available space behind vehicle 160 prior to and/or during the automated mode of operation. For examples, if vehicle sensor 175 detects that there is insufficient room behind the vehicle to disengage from one or more pallets, the vehicle controller may disable the automated mode of operation and/or notify the operator that some or all of the pallets may not be automatically separated.

First pallet 161 and second pallet 162 are shown as being located on the ground 169. In examples where the forks 165 are in a raised position when the automated mode of operation is actuated, the first pallet 161 and second pallet 162 may be lowered to the ground 169 during one or more initial steps or phases of the automated mode of operation.

At FIG. 6B, with the first pallet 161 and the second pallet 162 located on the ground 169, vehicle 160 is shown being moved in a direction 167 opposite the forks 165. Forks 165 may be withdrawn from the second pallet 162 such that the front end of the forks 165 is positioned below the first pallet 161. One of skill in the art will appreciate that the forks 165 may be configured to move or slide within the pallet frame or pockets such that forks 165 may be at least partially withdrawn from the pallet(s) without moving first pallet 161 and/or second pallet 162.

Vehicle 160 may be automatically moved a distance which approximately equals the length 163 of second pallet 162, such that the forks 165 are completely withdrawn from the second pallet 162. The length 163 of the second pallet may be approximately four feet. In some examples, a conventional U.S. pallet may be approximately forty inches wide by forty-eight inches long; however, other pallet sizes are contemplated herein, including those pallets which may commonly be used in other countries outside of the U.S.

Second sensor 172 may be located within the forks 165. In some examples, second sensor 172 may be located within, at, or near the tips of forks 165. Second sensor 172 may be configured to detect the presence of second pallet 162, such as in the operating condition shown at FIG. 6A. Additionally, second sensor 172 may be configured to detect when the tip of forks 165 has cleared second pallet 162, such as in the operating condition shown at FIG. 6B, indicating that forks 165 have been fully disengaged from second pallet 162.

At FIG. 6C, with the first pallet 161 located at the end of the forks 165, the forks 165 may be configured to raise 178 the first pallet 161 from the ground 169. The first pallet 161 may be automatically raised from the ground 169 by a lift height 173 which is less than the maximum lift height associated with the forks 165. The vehicle 160 may move the partially elevated first pallet 161 in a direction 177 away from the second pallet 162 by a predetermined distance 174.

At FIG. 6D, the first pallet 161 may be lowered back to the ground 169 at the predetermined distance 174 from second pallet 162. The predetermined distance 174 may be approximately three feet to provide sufficient clearance for an operator to walk between the pallets.

Elevating first pallet 161 to a reduced lift height 173 as shown at FIG. 6C, as opposed to the maximum lift height, may reduce the amount of time required to lower the first pallet 161 to the ground 169. In some examples, the forks 165 may again be moved in the direction 177 away from the second pallet 162 to completely withdraw the forks 165 from both first pallet 161 and second pallet 162. In some examples, second sensor 172 may be configured to detect when the tip of forks 165 has cleared first pallet 161.

After initiating the automated mode of operation and exiting the vehicle 160, the operator may walk up to the second pallet 162 with a roll of plastic wrapping, tie straps, or other type of securing material, while the vehicle 160 proceeds through the automated operation illustrated in FIGS. 6A-6D. The operator may begin securing the second pallet 162 while the automated mode of operation is still in process. After securing the second pallet 162, the operator may proceed to separately secure the first pallet 161. The loaded pallets may be separately secured to facilitate their transport to different destinations.

In examples in which forks 165 may be configured to concurrently transport three pallets, the operation illustrated by FIGS. 6A-6D may be repeated a second time, such that three loaded pallets may be automatically unloaded from the forks 165 and moved apart from each other by a predetermined distance to allow for separately wrapping or otherwise securing the three pallets.

FIGS. 7A-7D illustrate a further example automated mode of operating the industrial vehicle 160. In some examples, the automated mode of operation depicted in FIGS. 7A-7D may be understood as occurring substantially in the reverse order of the automated operation depicted by FIGS. 6A-6D, but with the loaded pallets having already been separately wrapped or otherwise secured.

Additionally, the automated operation illustrated by FIGS. 7A-7D may be understood to occur after the operation illustrated by FIGS. 6A-6D has been completed. Accordingly, the location and/or placement of the first pallet 161 and second pallet 162 relative to the forks 165 and/or vehicle 160 may be known. For example, the forks 165 may already be aligned with the two or more pallets, each of which may be separated by predetermined distance 174.

Figure 7A:
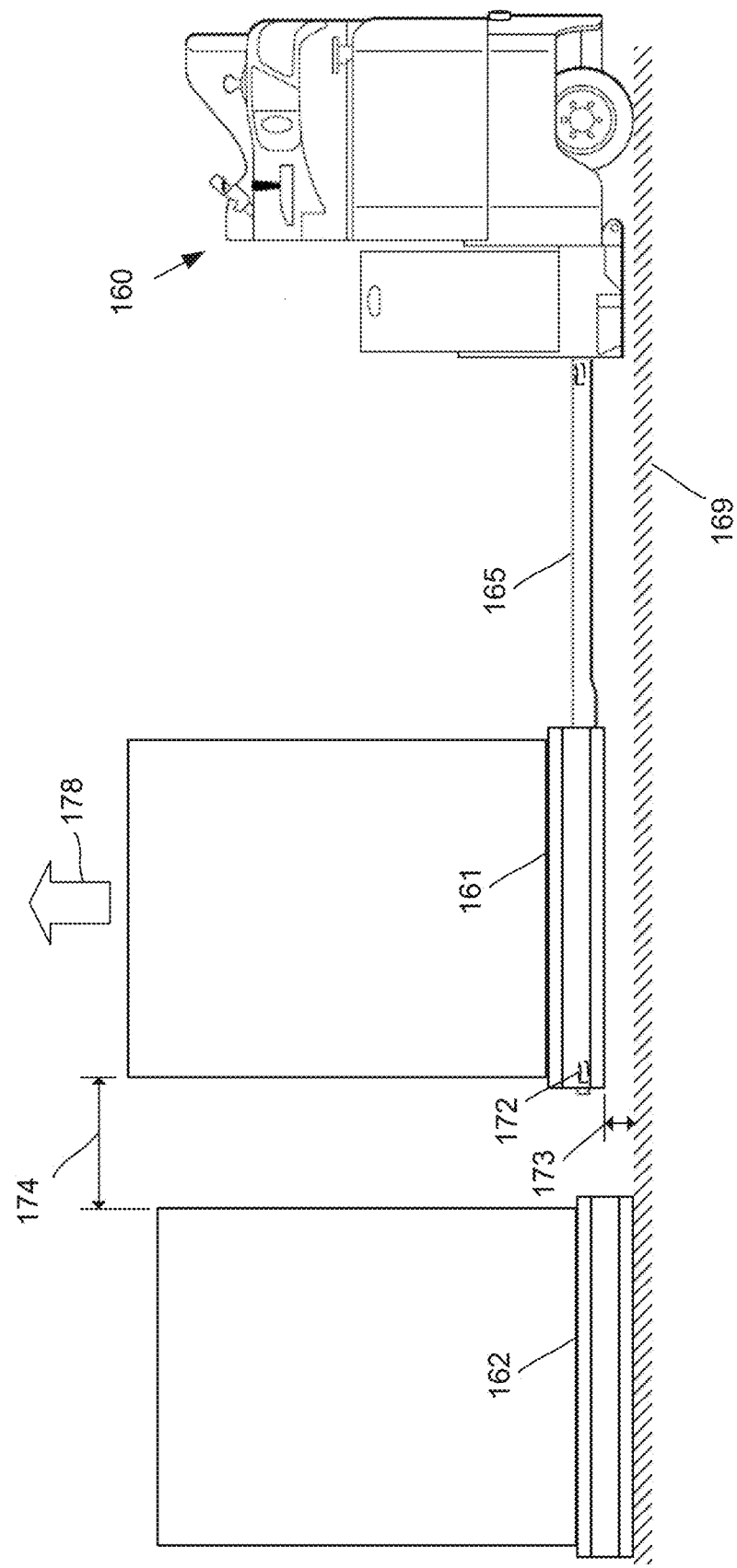

At FIG. 7A, with the first pallet 161 located at the end of the forks 165, the first pallet 161 may be raised 178 off the ground 169. The first pallet 161 may be automatically raised from the ground 169 at lift height 173, which may be less than the maximum lift height associated with the forks 165. In some examples, second sensor 172 may be configured to detect and/or confirm the presence of the first pallet 161 prior to initiating the further automated mode of operation.

At FIG. 7B, the vehicle 160 may move in the direction 176 of the forks 165 a predetermined distance with the first pallet 161 in the partially elevated position at lift height 173. In some examples, the predetermined distance may be approximately equal to the distance 174 (FIG. 7A) which separated first pallet 161 from second pallet 162.

Figure 7C:
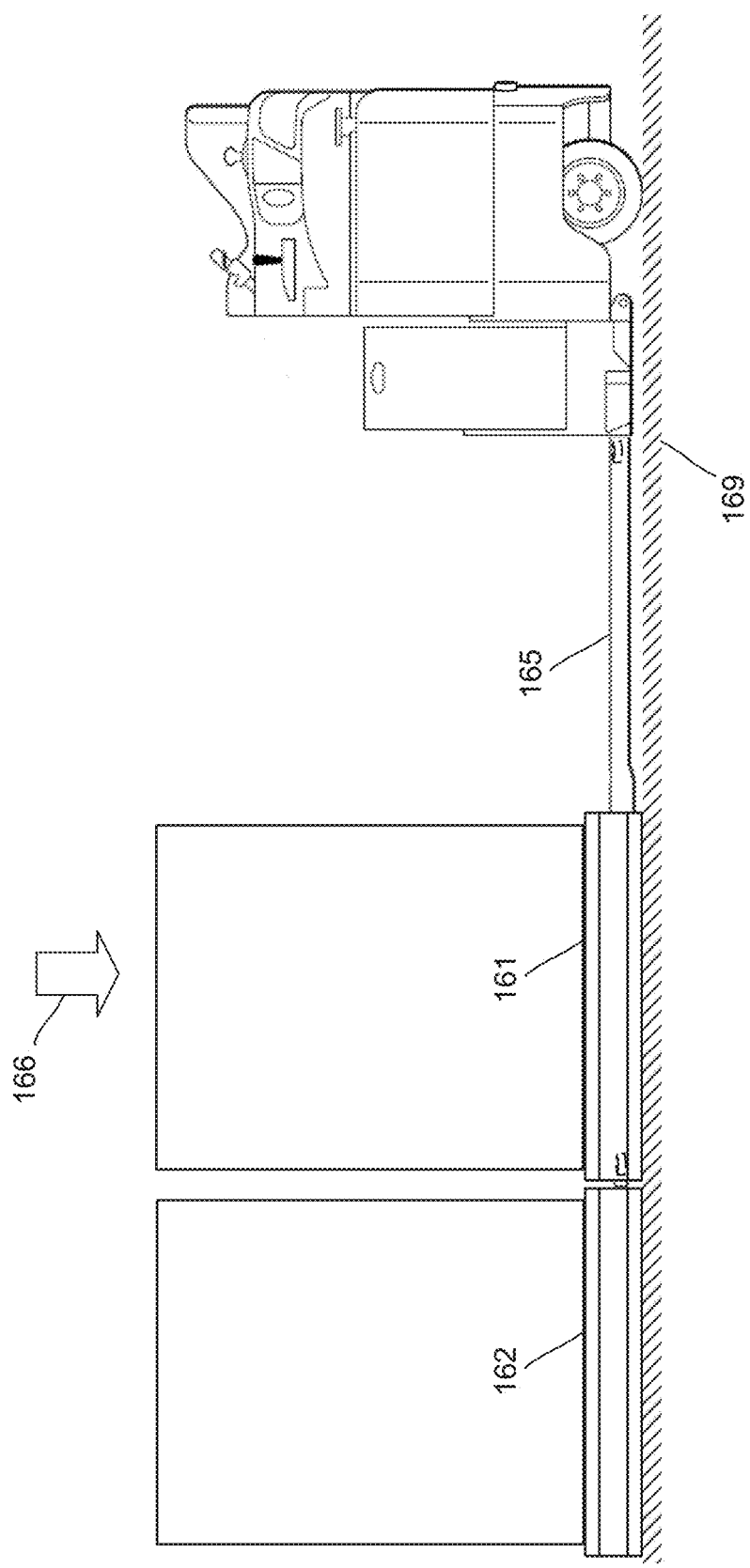
Figure 7D:
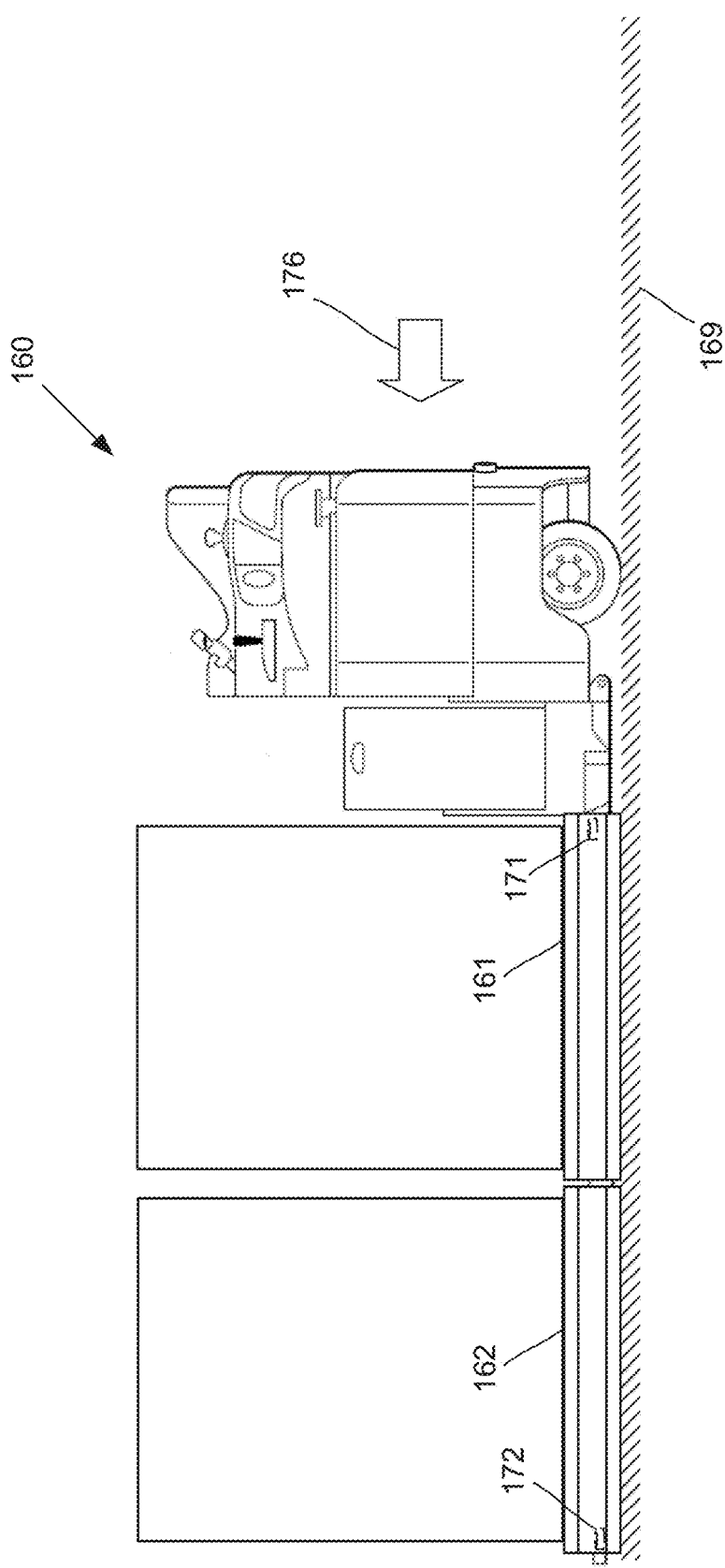

At FIG. 7C, the forks 165 may be lowered 166 such that first pallet 161 is placed on the ground 169 next to second pallet 162.

At FIG. 7D, vehicle 160 may again move in the direction 176 of the forks 165, such that the forks 165 may be inserted into the second pallet 162, with the first pallet 161 positioned above the back end of the forks 165 and the second pallet 162 positioned above the front end of the forks 165. In some examples, one or more sensors, such as first sensor 171 and second sensor 172 may be configured to detect the presence of one or both of first pallet 161 and second pallet 162.

With the forks 165 fully inserted into first pallet 161 and second pallet 162, both loaded pallets may be raised by forks 165. In some examples, both pallets may be automatically raised to the maximum lift height at the conclusion of the automated mode of operation, in order to reduce or minimize stress and/or wear on the lifting components during subsequent transport of the pallets.

The operator may then manually operate or drive the vehicle 160 to one or more destinations, such as a truck trailer. At a first destination, the automated operation illustrated by FIGS. 6A-6D may be performed, at least in part. For example, both wrapped pallets may be placed inside of the truck trailer, and then vehicle 160 may be configured to automatically move away from second pallet 162 and raise first pallet 161 as shown in FIGS. 6A-6C. Second pallet 162 may be left behind in the truck trailer and first pallet 161 may then be transported to a second destination. In some examples, the first pallet 161 may be transported to the second destination on the front end of the forks 165.

In examples in which forks 165 may be configured to concurrently transport three pallets, the operation illustrated by FIGS. 7A-7D may be repeated a second time, such that three loaded pallets may be automatically moved next to each other and loaded onto the forks 165 after the three pallets have been separately wrapped or otherwise secured.

Figure 8:
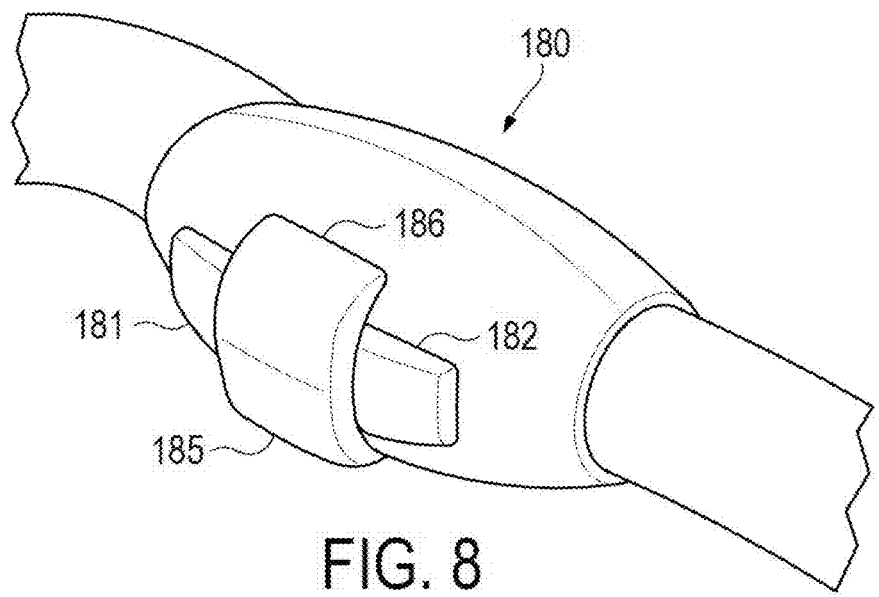
FIG. 8 illustrates a portion of a vehicle frame, including an example control bar.

FIG. 8 illustrates a portion of a vehicle frame, such as frame 75 of FIG. 1, including an example control bar 180. Control bar 180 may comprise a lower actuator 185, a lift actuator 186, and one or more traction actuators, such as a first traction control 181 and a second traction control 182. First traction control 181 may be associated with a walking speed, or slow rate of travel, whereas second traction control 182 may be associated with a transport speed, or fast rate of travel. In some examples, first traction control 181 may limit the maximum travel speed of the vehicle to approximately four miles per hour. On the other hand, second traction control 182 may limit the maximum travel speed of the vehicle to approximately nine miles per hour, by way of example only.

Figure 9:
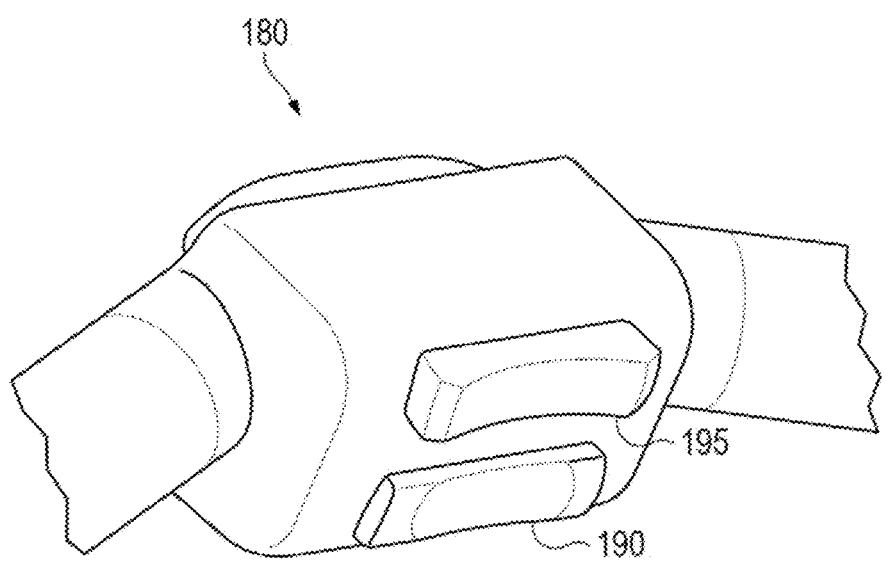
FIG. 9 illustrates a rear view of the example control bar of FIG. 8, including an automated mode actuator.

FIG. 9 illustrates a rear view of the example control bar 180 of FIG. 8, including an actuator 190. Actuator 190 may be configured to provide automated load handling of a pallet truck, as described in more detail below. A separate actuation device 195 or button may also be provided on the back of the control bar. Actuation device 195 may comprise a horn or other type of alert. In some examples, actuation device 195 may comprise an order picking or coast control actuation device. In still other examples, actuator 190 may comprise an order picking or coast control actuation device.

Actuator 190 may be configured to provide additional operational features for an industrial vehicle, such as a pallet truck. Actuator 190 may be configured to enable the operator to automate or semi-automate one or more functions of the vehicle, such as lifting, lowering and traction control, to improve ergonomics and increase productivity. In some examples, actuator 190 may be configured to enable the operator to change or augment the functionality of other controls on control bar 180 and/or control handle 15 (FIG. 4).

Actuator 190 may be communicatively coupled to a vehicle controller, such as electronic controller 45 (FIG. 1). The vehicle controller may receive a signal when actuator 190 is activated, which may place the vehicle in an automated mode of operation. In the automated mode of operation, software associated with the vehicle controller may be configured to initiate automated functionality to existing hardware on the truck that otherwise may be associated with manual actuation.

Actuator 190 may be configured to operate similarly as a "shift" key or a "caps lock" key on a computer keyboard. In some examples, concurrent actuation of actuator 190 and another control may result in an automated mode of vehicle operation. In other examples, consecutive actuation of actuator 190 followed by actuation of another control may result in the automated mode of vehicle operation. The vehicle controller may be configured to monitor the time between the consecutive actuations to ensure that the operator intended to engage the automated mode of operation. For example, the vehicle controller may be configured to engage the automated mode of operation if the consecutive actuation of the second control occurs within some predetermined time following actuation of actuator 190, such as within one or two seconds.

In some examples, the location of actuator 190 may enable simultaneous actuation of actuator 190 and one or more of the controls illustrated in FIG. 8 with a single hand of the operator. For example, the operator's thumb may be used to press or otherwise actuate first traction control 181 while the operator's forefinger presses or otherwise activates actuator 190.

Activation of actuator 190 and/or one or more other operator controls may be configured to place the vehicle in an automated mode of operation, such as automatically separating two or more pallets, as illustrated at FIGS. 6A-6D, or automatically loading two or more pallets, as illustrated at FIGS. 7A-7D.

Instead of utilizing actuator 190 to place the vehicle in the automated mode of operation, the operator may actuate or press an operator control (e.g. first traction controller 181, FIG. 8) twice in succession, similar to a "double-click" on a computer mouse. In order to filter inadvertent selection of the automated mode of operation, the vehicle controller may monitor for successive actuations of the operator control within a predetermined time period, such as within one second. In still other examples, the vehicle controller may be configured to place the vehicle in the automated mode of operation if the operator selects a sequence of control activations. For example, the operator may sequentially press or otherwise select first traction control 181 and lower actuator 185. In still other examples, the automated mode of operation may be engaged by concurrently pressing or otherwise selecting two or more operator controls.

When the industrial truck is configured with a sensor, such as switch 80 (FIG. 1) or first and second sensors 171, 172 (FIG. 6A), the vehicle controller may be configured to place the vehicle in the automated mode of operation based, at least in part, one or more pallet detection signals transmitted by the sensors.

The automated mode of operation may be disabled when the vehicle is moving. For example, the vehicle controller may be configured to monitor the speed of the vehicle and enable the automated mode of operation in response to receiving the request to actuate the automated mode of operation, only when the travel speed equals zero.

For industrial vehicles equipped with extra-long forks sized to handle two or more pallets, the automated mode of operation may be enabled to separate or split the pallets. In some examples, the automated mode of operation may be engaged when all of the pallets have been loaded.

In some examples of the automated mode of operation, the vehicle controller may be configured to lower the forks, raise the forks, activate the traction motor, separate pallets, perform other automated function, or any combination thereof, after the operator has left the vehicle, such as during an order picking operation. Accordingly, the operator may walk toward, alongside of the vehicle, or move from the vehicle towards the pallets while the pallets are being separated in the automated mode of operation.

The vehicle controller may be configured to monitor for braking and/or steering commands. In some examples, the braking and/or steering command may disable or deactivate the automated mode of operation.

Other vehicle functions may be automated or semi-automated through the addition of an automated mode of operation, with or without a separate automated actuator. Other types of automated modes of operation may be applied to functions such as auto-centering, auto-tilting, auto-rotating, and automatically spreading forks, or any combination thereof.

In an auto-centering application, an automated mode of operation may automate the forks or other type of load handling device to automatically center the load relative to the vehicle frame or load backrest. In a an auto-tilting application, an automated mode of operation may automate the forks or other type of load handling device to automatically rotate to a predetermined rotational angle, such as at ninety degree increments or to return the load to an upright position. Similarly, an automated mode of operation may automate the forks or other type of load handling device to automatically tilt forwards or to tilt backwards by a predetermined angle. The automated mode of operation may comprise a series of sequential and/or concurrent engagement of vehicle functions.

In one or more of the above examples, the industrial vehicle may comprise a number of "manual" controls that provide for standard functionality. For example, the standard functionality may require that the operator continuously actuate the control by pressing, holding, pulling, or otherwise actuating the control. In conjunction with activation of an automated actuator, the standard functionality associated with the controls may be transformed or associated with an automated mode of operation.

Figure 10:
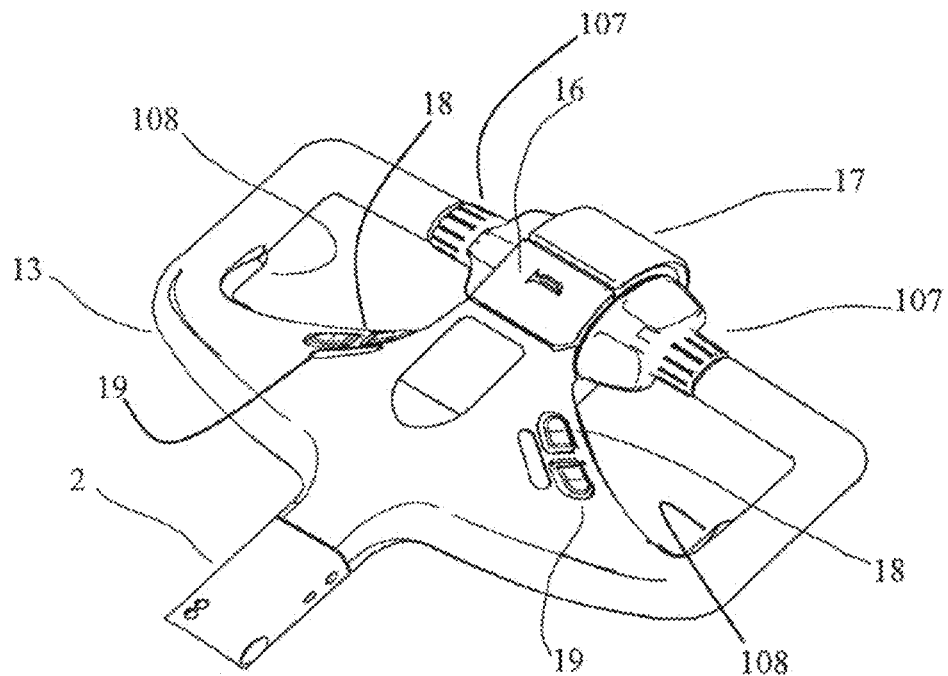
FIG. 10 illustrates an example control handle with an automated mode actuator.

FIG. 10 illustrates an example control handle 13 with an actuator 108. In some examples, control handle 13 may be associated with a "rider" style pallet truck. The steer control handle 13 may additionally comprise a horn button 16, an emergency reverse button 17, two lift buttons 18, and two lower buttons 19. The lift buttons 18 and lower buttons 19 may be configured to lift and lower, respectively, the forks upon which a load is placed. Two sets of lift buttons 18 and lower buttons 19 may be provided to facilitate operation by either a left or right handed operator. The emergency reverse button 17 may be configured to reverse the direction of a traction motor. The steer control handle 13 may be attached by means of a steer control arm 2 to control the direction of a drive wheel, which may be located directly under the traction motor 25, and to control the direction of travel of the pallet truck.

The steer control handle 13 may comprise two symmetrically located actuators 108 and two symmetrically located variable throttles 107. When the operator is on the operator platform or is walking alongside of the pallet truck, the operator may activate one of the actuators 108 or throttles 107 with the same hand that is holding and controlling the steer control handle 13. The pallet truck may be accelerated by means of traction motor that may be operated in either the low speed travel mode or the high speed travel mode.

The throttle 107 may comprise a butterfly type design which may be rotated forward, away from the operator, to cause the pallet truck to move in the reverse direction, or may be rotated backward, towards the operator, to cause the pallet truck to move in the forward direction, similar to a conventional motorcycle throttle. Other types of throttle 107 may be used, such as twist grips, buttons, toggles, and pedals.

With the throttle 107 positioned in the forward or reverse direction, the operator may simultaneously or sequentially press either of the first traction control 181 or the second traction control 182, located on the control bar 180 (FIG. 8). The operator may then continue to activate the throttle 107 in the high speed mode, whereby the pallet truck is able to travel at a higher maximum speed, for example when the operator needs to move a greater distance between picking loads. If the throttle 107 is released or placed in a neutral position, the pallet truck may be configured to coast to a stop, or caused to brake depending on the position of the steer control arm 2.

In some examples, actuator 108 may comprise a coast control actuation device. For example, actuator 108 may be configured to selectively engage a coast control system or an automated mode of operation of the vehicle. In a coast control mode of operation, actuator 108 may operate to engage the traction motor in an order picking mode of operation (e.g., a walking speed) in which the vehicle continues to coast after the actuator 108 is released. In the automated mode of operation, actuator may be configured to automatically separate or split two or more pallets.

In one or more examples in which actuator 108 may be configured to provide coast control functionality, the vehicle may remain in the coast control mode of operation until the vehicle coast control system is disengaged. A system and method for providing coast control is described in U.S. patent application Ser. No. 11/372,638, the contents of which are herein incorporated by reference.

Figure 11:
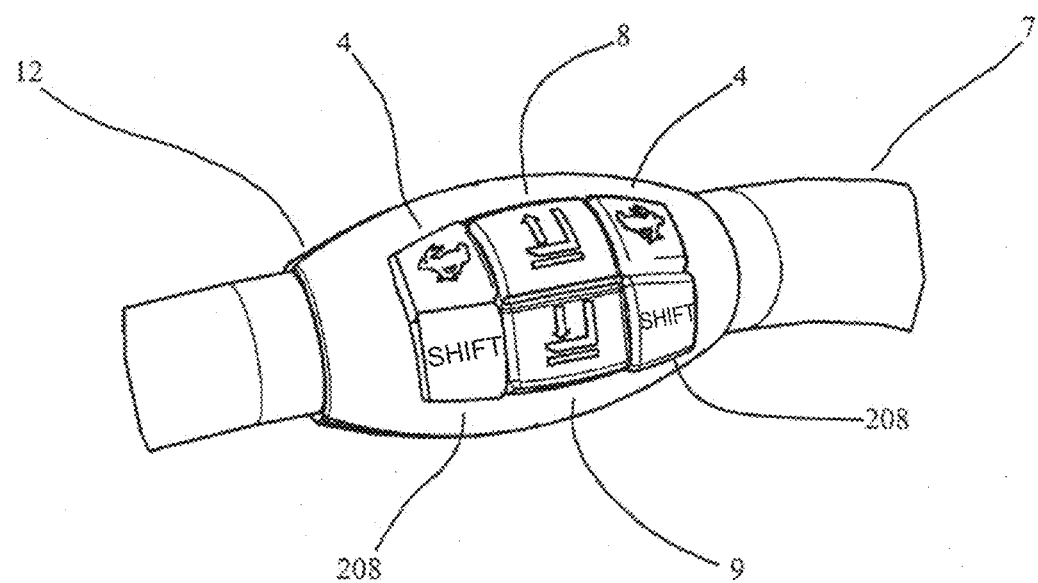
FIG. 11 illustrates an example control panel including two automated mode actuators.

FIG. 11 illustrates an example support bar 7 including a control panel 12. In some examples, support bar 7 may be associated with a rider style pallet truck. The control panel 12 may be equipped with two symmetrically located actuators 208, a lift button 8 and a lower button 9, which function to lift and lower, respectively, the forks, and two symmetrically located high-speed acceleration buttons 4. Actuators 208, lift button 8, lower button 9, and acceleration buttons 4 may be understood to provide the same or similar functions as other example operator controls and actuators disclosed with reference to some or all of the previous figures, including the automated separation of two or more pallets. By providing symmetric locations of the controls, the control panel may be more readily accessed from a left side or a right side, e.g., by a left-handed or a right-handed operator.

Figure 12:
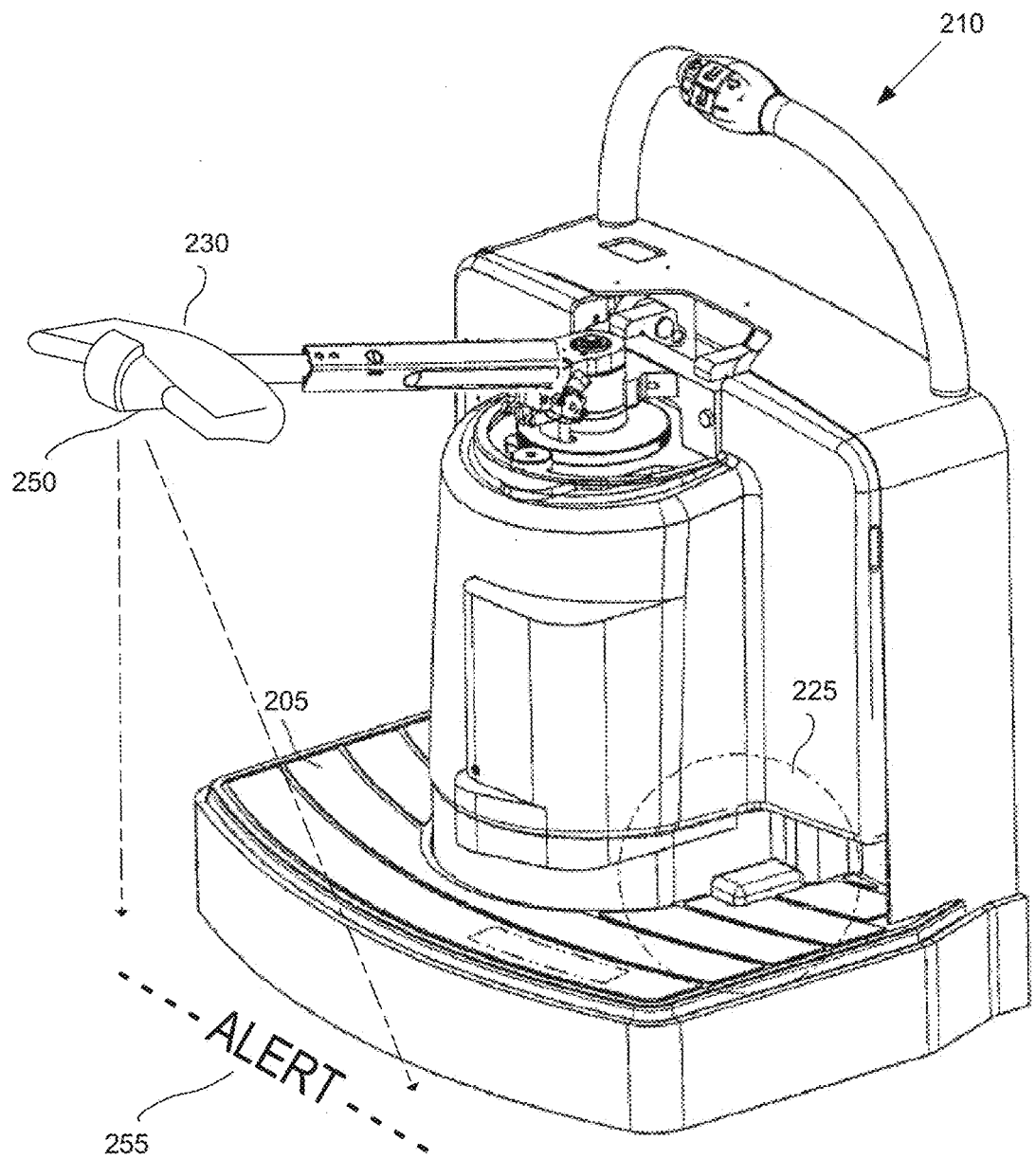
FIG. 12 illustrates a floorboard or operator platform of a pallet truck with an example automated mode actuator.

FIG. 12 illustrates a floorboard or operator platform 205 of a pallet truck 210 with an example actuator 225. The operator platform 205 may be associated with a "rider" style pallet truck, in which the operator may either ride on the operator platform 205 during operation of the pallet truck 210, or walk next to the pallet truck 210 while holding a control handle 230. The pallet truck 210 may comprise one or more forks (not shown) attached to the vehicle frame on an opposite side from the operator platform 205.

Actuator 225 may be mounted to the operator platform 205 such that the operator may enable the automated mode of operation of the vehicle by depressing actuator 225 with the operator's foot. In some example modes of operation, actuator 225 may also be configured to monitor the operator's presence. The vehicle controller may be configured to enable or disable one or more vehicle functions according to input received from actuator 225.

Pallet truck 210 is illustrated with control handle 230 equipped with a light emitting device 250 located on a side of control handle 230 facing the operator platform 205. In some examples, light emitting device 250 may be located on the tiller arm connecting the control handle 230 to the pallet truck 210. In other examples, light emitting device 250 may be located on the frame of the pallet truck 210.

Light emitting device 250 may be activated when pallet truck 210 is placed in one or more modes of operation, such as coast control. In some examples, light emitting device 250 may be activated when pallet truck 210 is placed in an automated mode of operation. Light emitting device 250 may be configured to emit and/or transmit an alert 255 which may appear on the transport surface or ground on which the pallet truck 210 is operating. In some examples, light emitting device 250 may be configured to shine alert 255 onto the transport surface when pallet truck 210 is both operating in a particular mode of operation and moving. In other examples, alert 255 may be displayed anytime that pallet truck 210 is moving. Alert 255 may be used to notify pedestrians and/or operators that the pallet truck 210 is moving, or that the pallet truck 210 may begin to move.

Other than physical location, one or more of actuators 108, 190, 208, and 225 may be interchangeably configured to provide the same or similar functionality as any of the examples described above. An actuator may be located on other components or locations of the vehicle and achieve similar results as one or more of the examples described herein. In some examples, the actuator may be provided on a wireless control device, a handheld device, or a wearable that the operator may use to remotely operate the vehicle according to some or all of the examples provided herein.

Figure 13:
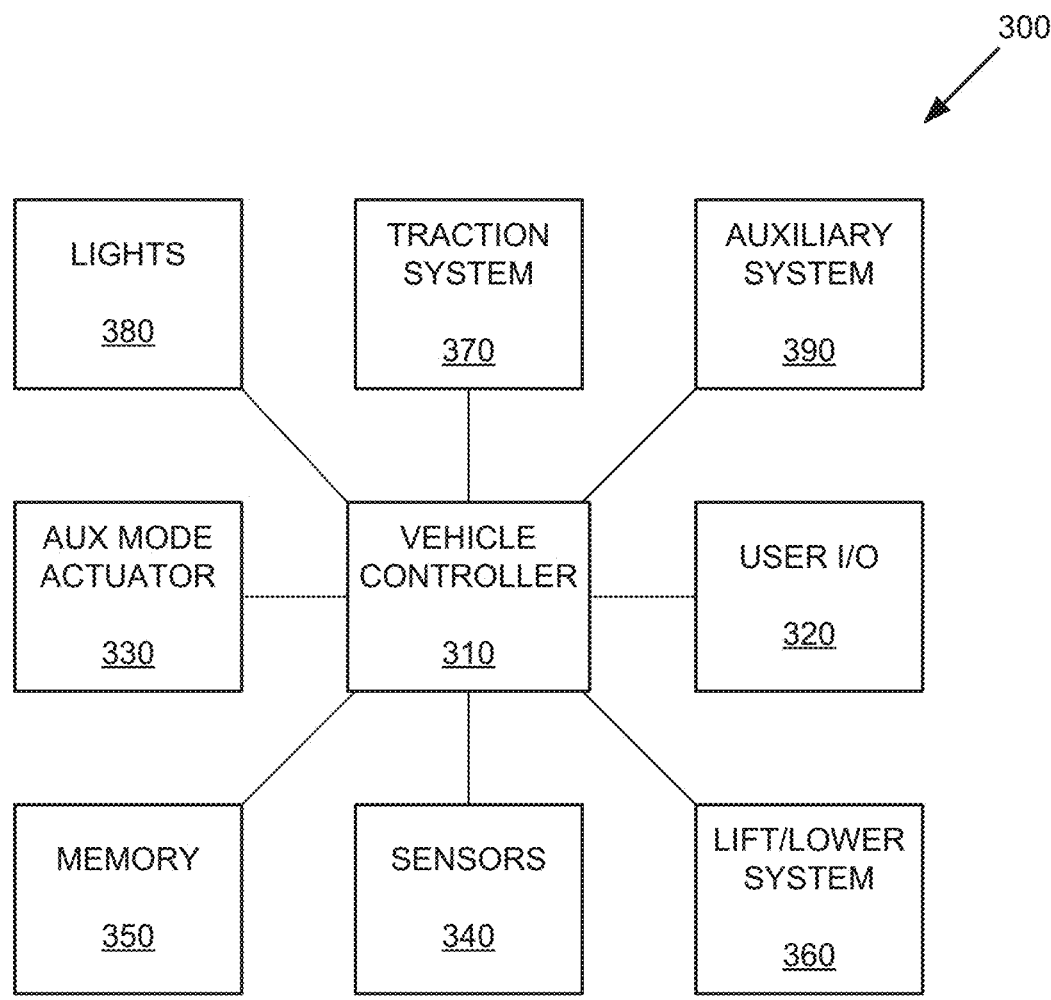
FIG. 13 illustrates a block diagram of a system for providing an automated load handling operation.

FIG. 13 illustrates a block diagram of a control system 300 for providing an automated load handling operation, including automatically separating two or more pallets. Control system 300 may comprise a vehicle controller 310 communicatively coupled to an operator controlled input/output device 320 and an automated or auxiliary mode actuator 330.

The auxiliary mode actuator 330 and/or input/output device 320 may be configured to actuate a vehicle system in the automated mode of operation. In some examples, the vehicle system may comprise a lift/lower system 360, a traction system 370, lights 380, and/or other types of auxiliary systems 390 such as systems configured to perform load handling functions such as center, tilt, rotate, and spread, or any combination thereof.

Input/output device 320 may be configured to transmit a control signal to vehicle controller 310. In some examples, the control signal may be sent continuously, or repeatedly. In other examples, the control signal may comprise a single instance of a signal.

Auxiliary mode actuator 330 may be configured to transmit an activation signal to vehicle controller 310. Auxiliary mode actuator 330 may be configured to generate the activation signal in response to being actuated by an operator. In some examples, the activation signal may be transmitted to vehicle controller 310 at the same time that the control signal is being transmitted by input/output device. In other examples, the activation signal may be transmitted to vehicle controller 310 before or after the control signal is transmitted. Vehicle controller 310 may be configured to actuate the vehicle system in the automated mode of operation in response to receiving both the control signal and the activation signal.

The vehicle controller 310 may be configured to place the vehicle in an automated mode of operation in response to receiving the activation signal. In some examples, vehicle controller 310 may be configured to place the vehicle system in the automated mode of operation in response to receiving a concurrent transmission of both the control signal and the activation signal. In other examples, the vehicle controller 310 may be configured to place the vehicle system in the automated mode of operation in response to receiving the control signal within a predetermined time period after receiving the auxiliary signal. The predetermined period of time may be less than approximately one second, by way of non-exhaustive example.

Lift/lower system 360 may comprise a lifting device configured to actuate one or more forks by lifting and lowering the forks. For example, in a manual mode of operation, lift-lower system 360 may be configured to lift or lower the forks while the operator presses or actuates an actuation device or otherwise requests lift or lower via input/output device 320. Lift/lower system 360 may be configured to raise and lower a set of forks that concurrently support two or more pallets including a first pallet and a second pallet linearly positioned along a length of the forks.

The forks may be raised to the maximum lift height or lowered to the ground or, in the event that the operator releases or otherwise ceases to command the lift/lower system 360, the forks may stop at some intermediate height. On the other hand, during the automated mode of operation, lift-lower system 360 may continue to lift and/or lower the forks and as instructed by vehicle controller 310, after the control signal is no longer being transmitted by input/output device 320.

The industrial vehicle may comprise an operator platform configured to support an operator, and the vehicle system may continue to be actuated in the automated mode of operation after the operator has left the operator platform. In some examples, the auxiliary mode actuator 330 may comprise a switch or sensor located on the operator platform.

Additionally, the industrial vehicle may comprise a grab bar or control bar. The grab bar may be mounted to the vehicle frame. In some examples, the auxiliary mode actuator 330 may be located on the grab bar. One or more operator input devices may also be located on the grab bar.

Certain types of industrial vehicles, such as a pallet truck, may comprise a steering control arm. The steering control arm may be configured to steer, brake, and/or command the vehicle to perform additional functions. The input/output device 320 may be located on an end of the steering control arm, and both the auxiliary mode actuator 330 and the input/output device 320 may be accessible by the operator for concurrent actuation. In some examples, both the auxiliary mode actuator 330 and the input/output device 320 may be actuated concurrently by the same hand of the operator.

The steering control arm may be configured to be operated by an operator walking next to the industrial vehicle, and both the input/output device 320 and the auxiliary mode actuator 330 may be located on an end of the steering control arm. In some examples, the vehicle system may continue to be actuated in the automated mode of operation after the operator has released the steering control arm. For example, the steering control arm may be released by the operator and automatically return to an upright position.

Control system 300 may further comprise one or more sensors 340, including a sensor configured to detect the presence of one or more pallets. Vehicle controller 310 may be configured to actuate the vehicle system in the automated mode of operation in response to receiving the auxiliary mode signal provided that the presence of the pallet(s) is detected by the sensor or switch.

In some examples, one or more sensors 340 may be used to determine the presence of the operator or to detect one or more objects located proximate to the vehicle including pedestrians, other vehicles, racks, navigation markers, RFID chips, other types of objects, or any combination thereof. Additionally, one or more sensors 340 may be configured to determine a distance, such as a distance to an object, a height of an object, a lift height, other types of distances and/or dimensions, or any combination thereof.

One or more sensors 340 may be configured to detect a presence of one or both of the first pallet and the second pallet and to generate a pallet presence signal. Vehicle controller 310 may be configured to perform at least a portion of the automated load handling operation in response to receiving both the pallet presence signal and the activation signal. Additionally, one or more sensors 340 may be configured to detect when the end of the forks has been withdrawn from the second pallet. In some examples, one or more sensors 340 may be configured to detect when the first pallet is located on a back end of the forks and when the second pallet is located on the front end of the forks.

One or more sensors 340 may be configured to monitor for an obstacle located proximate to the vehicle and to generate a proximity alert in response to detecting the obstacle. Vehicle controller 310 may be configured to disable the automated load handling operation in response to detecting the obstacle. For example, vehicle controller 310 may be configured to disable the automated load handling operation in response to detecting that a distance to the obstacle is less than a total distance required by the vehicle to move in the direction of travel to both withdraw the forks from the second pallet and space apart the first pallet from the second pallet by the predetermined distance. The total distance required to both withdraw the forks from the second pallet and space apart the first pallet from the second pallet may be approximately six to eight feet, or approximately two meters.

Traction system 370 may comprise a motor, an engine, a transmission, a drive train, a number of wheels, tracks, other types of tractive devices, or any combination thereof. Traction system 370 may be configured to move the industrial vehicle in a forward or backwards direction, according to the commanded action via input/output device 320 or as otherwise instructed by vehicle controller 310. During a manual mode of operation, the traction system 370 may be configured to move the industrial vehicle while the operator presses or actuates an actuation device or otherwise requests traction via input/output device 320.

During an automated mode of operation, the traction system 370 may be configured to automatically move the industrial vehicle by a predetermined distance and/or as otherwise instructed by vehicle controller 310. The predetermined distance may provide sufficient clearance for the operator to walk between the first pallet and the second pallet, for example between two and three feet.

Traction system 370 may be configured to move the vehicle in a first direction of travel associated with withdrawing the forks from the pallets, and in a second direction of travel associated with inserting the forks into the pallets. During the automated mode of operation, vehicle controller 310 may be configured to actuate the traction system a first time to move the vehicle in the first direction of travel so that a front end of the forks moves from being under the second pallet to being under the first pallet. Additionally, vehicle controller 310 may be configured to actuate the lifting system to raise the first pallet supported on the front end of the forks while the second pallet remains on a transport surface.

Vehicle controller 310 may be configured to actuate the traction system a second time to move the vehicle in the direction of travel so that the first pallet is spaced apart from the second pallet by a predetermined distance. Additionally, vehicle controller 310 may be configured to actuate the lifting system to lower the first pallet to the transport surface at the predetermined distance from the second pallet.

During the automated load handling operation, vehicle controller 310 may further be configured to actuate the traction system a third time to move the vehicle in the first direction of travel so that the front end of the forks is completely removed from both the first pallet and the second pallet. In some examples, the vehicle may be moved in the direction of travel by a second instance of the predetermined distance when the traction system is actuated the third time. The second instance of the predetermined distance may provide sufficient clearance for the operator to walk between the first pallet and the withdrawn forks, for example between two and three feet.

Lights 380 may be configured to provide a visual indication to pedestrians that the vehicle has been placed in the automated mode of operation. In some examples, lights 380 may comprise one or more light emitting devices and be configured to provide an operator awareness system, as further disclosed herein.

Figure 14:
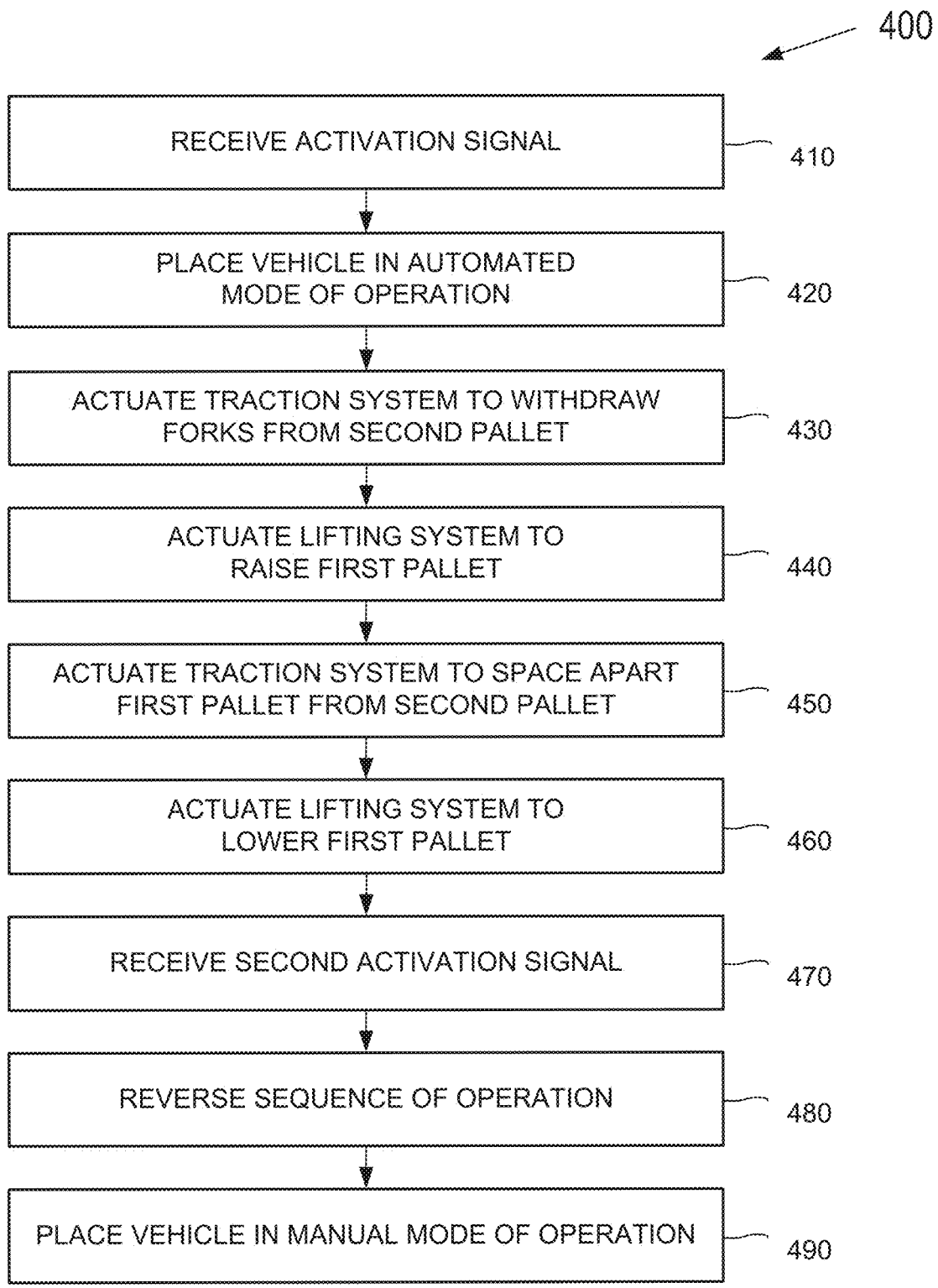
FIG. 14 illustrates an example automated load handling process.

FIG. 14 illustrates an example automated load handling process 400 of an industrial vehicle. The vehicle may have a set of forks configured to concurrently support both a first pallet and a second pallet linearly positioned along a length of the forks, and a lifting system configured to raise and lower the forks. Additionally, a traction system may be configured to move the vehicle in a first direction of travel associated with withdrawing the forks from pallets and in a second direction of travel associated with inserting the forks into pallets. Some or all of the operations described with respect to process 400 may be performed by, or at the instruction of, a vehicle controller.

At operation 410, an activation signal may be received from an operator enabled actuation device. The operator enabled actuation device may comprise one or more operator controls configured to actuate a vehicle feature such as lift, lower, accelerate, brake, coast, other features, or any combination thereof. In some examples, operator enabled actuation device may comprise an actuation device provided solely to place the vehicle in an automated mode of operation. In other examples, the activation signal may be generated by a combination of operator enabled controls being actuated concurrently or sequentially. In other examples, the activation signal may be generated by a different actuation device that is not operator-enabled. For example, the activation signal may be generated through a computing device or some other non-operator-enabled means.

At operation 420, the vehicle may be placed in an automated mode of operation based, at least in part, on the activation signal. The vehicle controller may also command the vehicle system to operate in the automated mode depending on a sensor signal. For example, the vehicle controller may determine whether to operate the vehicle in the automated mode of operation based, at least in part, the presence or absence of the sensor signal.

The vehicle controller may be configured to receive a sensor signal or pallet presence signal from one or more sensors located within the forks, and the vehicle may be placed in the automated mode of operation based, at least in part, on both the pallet presence signal and the activation signal. Additionally, the sensor signal may identify the weight of the pallet(s) on the forks, the position of the pallet(s) on the forks, the size of the pallet(s), the state of the pallet(s) (e.g., empty, laden, wrapped or secured, unwrapped or unsecured, etc.), the number of pallets on the forks, the presence of obstacles, the presence of pedestrians, the presence of the operator, the presence of a rack, other vehicle and/or environmental sensory information, or any combination thereof.

In some examples, the vehicle controller may receive an obstacle monitoring signal from one or more sensors located on the vehicle, and the vehicle may be placed in the automated mode of operation based, at least in part, on a determination that there are no immediate obstacles in the direction of travel. A distance to the nearest obstacle may be determined based on the obstacle monitoring signal, and the vehicle may be placed in the automated mode of operation based, at least in part, on a determination that the distance to the nearest obstacle is less than a total distance that the vehicle is required to move in the direction of travel while performing the load handling operation.

At operation 430, the traction system may be actuated to move the vehicle in the first direction of travel during the automated mode of operation, so that a front end of the forks moves from being under the second pallet to being under the first pallet.

At operation 440, the lifting system may be actuated to raise the first pallet supported on the front end of the forks during the automated mode of operation, while the second pallet remains on a transport surface.

In some examples, load handling process 400 may comprise controlling one or more light emitting devices mounted on the vehicle to provide a visual indication that the vehicle has been placed in the automated mode of operation. The one or more light emitting devices may be configured to emit a first light characteristic when the vehicle is being manually operated, and the one or more light emitting devices may be controlled to emit a second light characteristic when the vehicle has been placed in the automated mode of operation.

At operation 450, the traction system may be actuated to move the vehicle in the first direction of travel during the automated mode of operation, so that the first pallet is spaced apart from the second pallet by a predetermined distance. The predetermined distance may provide sufficient clearance for the operator to walk between the first pallet and the second pallet, such as approximately three feet or one meter of clearance.

At operation 460, the lifting system may be actuated during the automated mode of operation, to lower the first pallet to the transport surface at the predetermined distance from the second pallet.

In some examples, load handling process 400 may further comprise actuating the traction system a third time to move the vehicle in the first direction of travel so that the front end of the forks is completely removed from both the first pallet and the second pallet. The vehicle may be moved in the first direction of travel by a second instance of the predetermined distance when the traction system is actuated the third time. The predetermined distance may provide sufficient clearance for the operator to walk between the first pallet and the withdrawn forks, such as approximately three feet or one meter of clearance.

At operation 470, a second activation signal may be received from the operator enabled actuation device, for example after the first pallet has been lowered to the transport surface at the predetermined distance from the second pallet. The vehicle may be placed in, or otherwise resume, an automated mode of operation based, at least in part, on the second activation signal.

At operation 480, some or all of the operations 430-460 of load handling process 400 may be substantially performed in a reverse sequence of operation to load the first and second pallets onto the forks. For example, the lifting system may be actuated to raise the first pallet supported on the end of the forks from the transport surface during a second automated mode of operation in which the first pallet is laterally spaced apart from the second pallet by the predetermined distance. Additionally, the traction system may be configured to move the vehicle in the second direction of travel during the second automated mode of operation, so that the first pallet is moved towards the second pallet by the predetermined distance.

The lifting system may be actuated to lower the first pallet to the transport surface during the second automated mode of operation, so that the first pallet is located next to the second pallet on the transport surface. Additionally, the traction system may be actuated to move the vehicle in the second direction of travel during the second automated mode of operation, so that the front end of the forks moves from being under the first pallet to being under the second pallet.

In some examples, a pallet presence signal may indicate that one or both of the first pallet and the second pallet are located above the forks during the second automated mode of operation. The lifting system may be configured to raise the forks to a maximum lift height during the second automated mode of operation, in response to receiving the pallet presence signal.

At operation 490, the vehicle may be placed in a manual mode of operation at the conclusion of the load handling operation. In some examples, the vehicle may be placed in in the manual mode of operation after the forks have been raised to the maximum lift height.

The vehicle controller may receive a deactivation signal. The deactivation signal may be sent as a result of an operator initiated command. In other examples, the deactivation signal may comprise a sensor signal. In still other examples, the deactivation signal may be generated as a result of the lapse of a predetermined period of time.

The vehicle controller may be configured to deactivate the automated mode of operation in response to receiving the deactivation signal. In other examples, the vehicle controller may be configured to automatically deactivate the second mode of operation at the conclusion of the automated load handling operation, such as when the pallets have been completely separated.

Additionally, the vehicle controller may be configured to deactivate the automated mode of operation upon receiving or otherwise detecting one or more of the following: a second or subsequent activation of the actuator, two or more sequential actuations of one of the vehicle controls, prolonged actuation of an operator control, a braking command, an acceleration request, a steering request, other types of events and/or signals, or any combination thereof.

Figure 15:
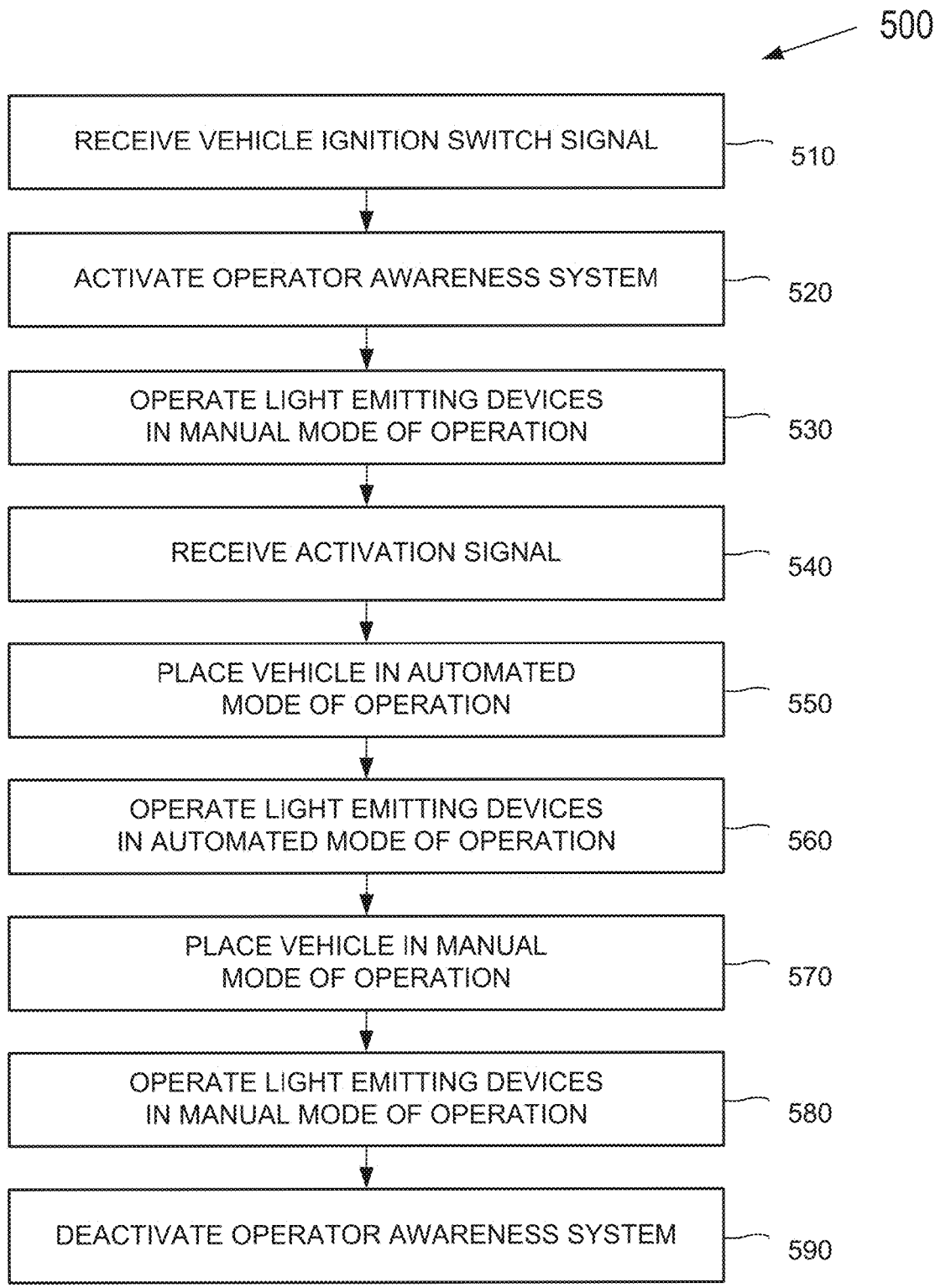
FIG. 15 illustrates an example process for providing operator awareness.

FIG. 15 illustrates an example process 500 for providing operator awareness for an industrial vehicle. Some or all of the operations described with respect to process 500 may be performed by, or at the instruction of, a vehicle controller.

At operation 510, a vehicle ignition switch signal may be generated in response to the vehicle being started or turned on. The ignition switch signal may be transmitted to the vehicle controller.

At operation 520, an operator awareness system may be activated in response to the vehicle ignition switch signal. For example, one or more light emitting devices may be activated or illuminated to indicate that the vehicle has been turned on. The one or more light emitting devices may be illuminated with a first light characteristic, such as a first frequency, a first duration, a first color, a first intensity, some other type of characteristic, or any combination thereof. In some examples, the first light characteristic may indicate that the vehicle is being operated in a manual mode of operation.

At operation 530, the one or more light emitting devices may be operated in the manual mode of operation.

At operation 540, an activation signal may be transmitted to the vehicle controller. The activation signal may be transmitted in response to actuation of one or more operator enabled controls to place the vehicle in an automated mode of operation.

At operation 550, the vehicle may be placed in the automated mode of operation. At operation 560, the one or more light emitting devices may be operated in the automated mode of operation. The one or more light emitting devices may be illuminated with a second light characteristic, such as a second frequency, a second duration, a second color, a second intensity, some other type of characteristic, or any combination thereof. In some examples, the second light characteristic may indicate that the vehicle is being operated in an automated mode of operation.

At operation 570, the vehicle may be placed back in the manual mode of operation. The vehicle may be placed in the manual mode of operation in response to a completion of the automated mode of operation or in response to the transmission of a deactivation signal.

At operation 580, the one or more light emitting devices may be operated in the manual mode of operation. For example, the one or more light emitting devices may be illuminated with the first light characteristic.

At operation 590, the operator awareness system may be deactivated. The operator awareness system may be deactivated in response to a vehicle ignition switch signal that is generated in response to the vehicle being turned off. In other examples, the operator awareness system may be deactivated in response to the transmission of a deactivation signal.

Figure 16A:
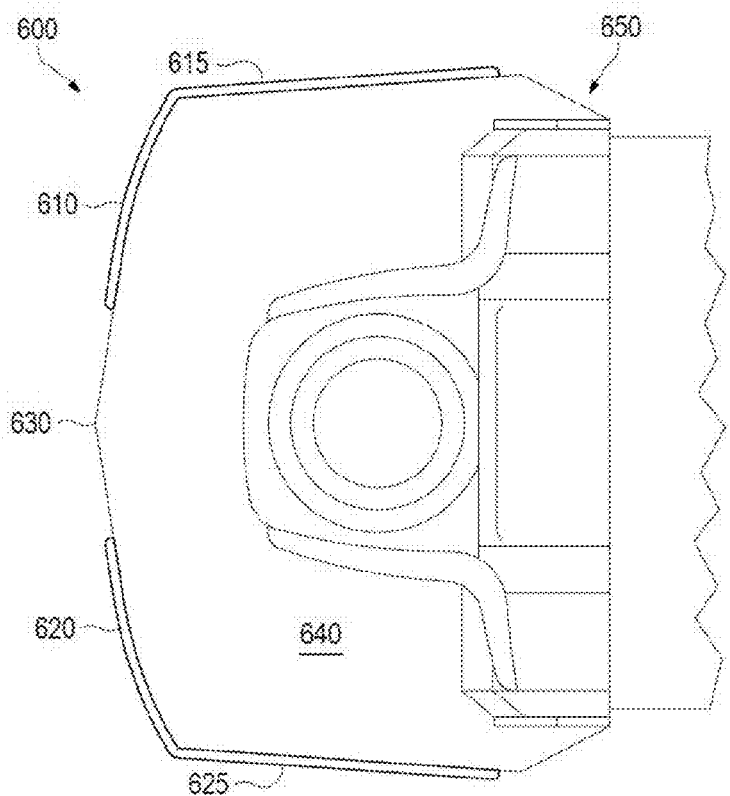
FIGS. 16A-16B illustrate a top view of an example operator awareness system.
Figure 16B:
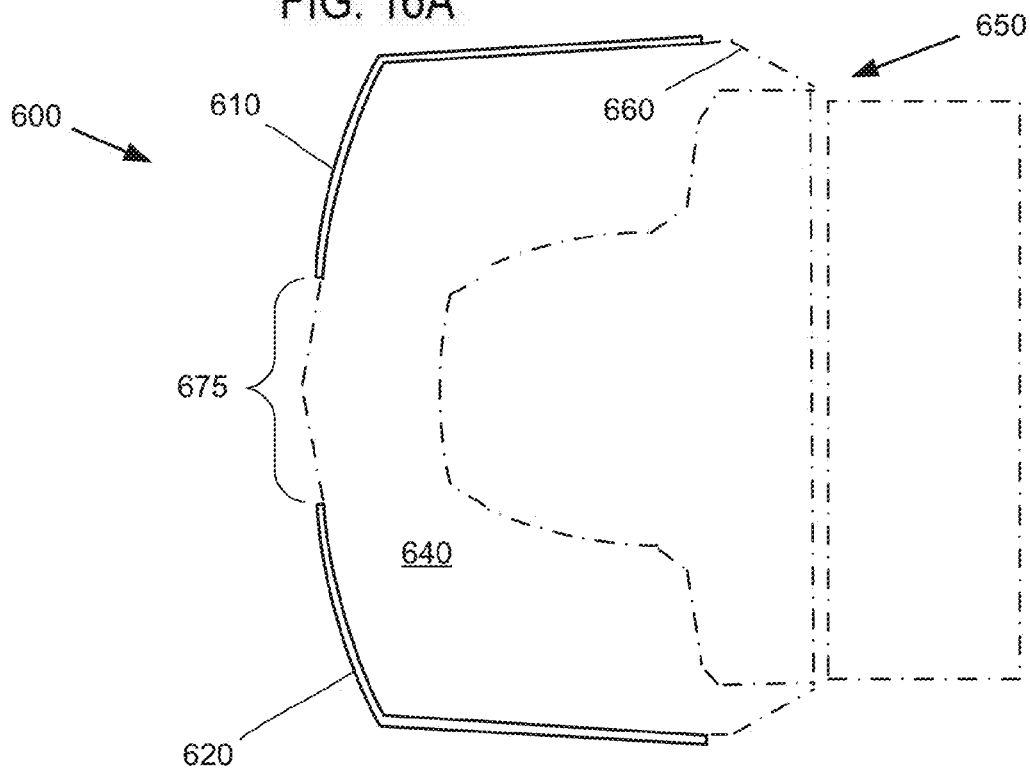

FIG. 16A illustrates a top view of an example operator awareness system 600 for an industrial vehicle 650 such as an end rider pallet truck. FIG. 16B is provided to highlight the relative position of operator awareness system 600 relative to vehicle 650 (partially shown in dashed environmental lines). Operator awareness system 600 may comprise a plurality of light emitting devices, such as a first light emitting device 610 and a second light emitting device 620, located proximate to an operator platform 640. First light emitting device 610 is illustrated as being located at an approximate right corner, or right side 615 of vehicle 650, whereas second light emitting device 620 is illustrated as being located at an approximate left corner, or left side 625 of vehicle 650.

In some examples, first light emitting device 610 may wrap around the right corner of vehicle 650 from the right side 615 to the end 630 of the vehicle 650, and second light emitting device 620 may wrap around the left corner of vehicle 650 from the left side 625 to the end 630. In other examples, one or more end light emitting devices may be provided separately from first light emitting device 610 and second light emitting device 620. For example, the operator awareness system may comprise one or more light emitting devices located at the right side 615, one or more light emitting devices located at the left side 625, and one or more light emitting devices located at the end 630.

Operator awareness system 600 may operate as running lights for vehicle 650, such as in a warehouse, inside of a trailer, or when working in other environments in which the lighting may have a non-uniform intensity or be substantially non-existent, or where visibility may otherwise be impaired. For example, one or both of first light emitting device 610 and second light emitting device 620 may be configured to be continuously illuminated during operation of the vehicle 650, such as to provide illumination proximate to the vehicle 650. Such illumination may also contribute to pedestrian awareness of the vehicle presence. The mode of operation may be selectable, e.g., turned on or off, by the operator and/or by a service technician.

Additionally, operator awareness system 600 may be configured to illuminate at least a portion of the outline or boundary 660 of the operator platform 640. For example, operator awareness system 600 may provide the operator with additional visual clues about the overall location and extent of the operator platform 640 relative to the operator's feet, such as when operating in dimly lit environments. Operator awareness system 600 may be configured to facilitate operator ingress and egress from the vehicle 650, as well as foot placement and driving posture when operating the vehicle 650.

A differential region 675, for example, devoid of light or having different light characteristics, may be provided at the end 630 between first light emitting device 610 and second light emitting device 620, at or near the center of vehicle 650, to further facilitate operator recognition and awareness of the platform profile or boundary 660. In some examples, first light emitting device 610 and second light emitting device 620 may comprise white or colored light emitting diode (LED) banded lighting.

Operator awareness system 600 may be configured to communicate, signal, or otherwise indicate one or more modes of operations or actions of vehicle 650. For example, when the vehicle 650 is not moving one or more of the light emitting devices may be dimly lit, static, turned off, or displayed in a first color, such as red. On the other hand when the vehicle 650 is moving, one or more of the light emitting devices may be turned on, brightly lit, flash, blink, turned on, or displayed in a second color, such as white or green.

Additionally, one or more of the light emitting devices may be separately actuated to indicate that the vehicle 650 is turning. For example, first light emitting device 610 may blink or otherwise be actuated during a right turn, and second light emitting device 620 may blink or otherwise be actuated during a left turn. Other vehicle operations and/or conditions such as lift, lower, coast, high speed, low speed, operator presence, pallet separation, and automated modes of operation may also be indicated by varying or otherwise controlling actuation of operator awareness system 600.

The vehicle controller may vary the frequency, duration, color, intensity, or other features associated with one or more of the light emitting devices to indicate a transition from one mode of vehicle operation to another. For example, the color of one or more light emitting devices may change when the vehicle 650 transitions from a manual mode of operation to an automated mode of operation, such as pallet separation. In some examples, one or more light emitting devices may change from a first color to a second color when the automated mode of operation is selected or when the operator leaves the platform 640. The vehicle controller may use input received from an operator presence detector, such as actuator 225 (FIG. 12) to determine when or how to actuate operator awareness system 600.

In other examples, one or more of the light emitting devices may comprise sensors configured to emit a light wave or otherwise generate a signal which may be used to identify, detect, measure, or otherwise monitor the surrounding environment of vehicle 650. For example, first light emitting device 610 may be configured to monitor one or more regions located proximate to the right side 615 or right corner of vehicle 650, and second light emitting device 610 may be configured to monitor one or more regions located proximate to the left side 625 or left corner of vehicle 650.

In response to monitoring the surrounding environment, system 600 may be configured to actuate one or more vehicle lighting devices and/or or horns to signal to nearby pedestrians or operators a particular operation of vehicle 650. In some examples, one or both of first light emitting device 610 and second light emitting device 620 may flash or otherwise be illuminated when vehicle 650 is braking or moving, such as in a forks-trailing direction of vehicle travel.

Figure 17A:
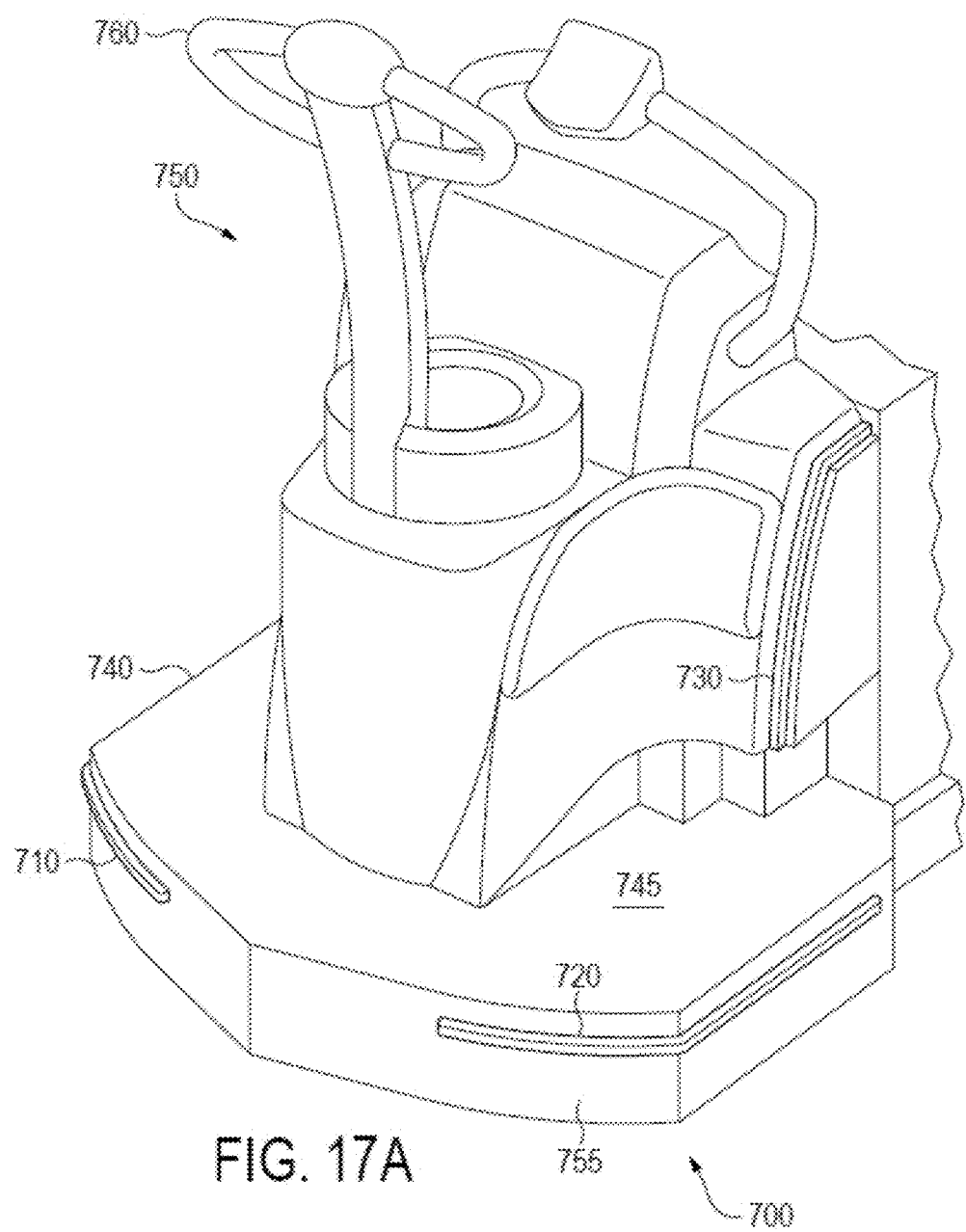
FIGS. 17A-17B illustrate a perspective view of another example operator awareness system.
Figure 17B:
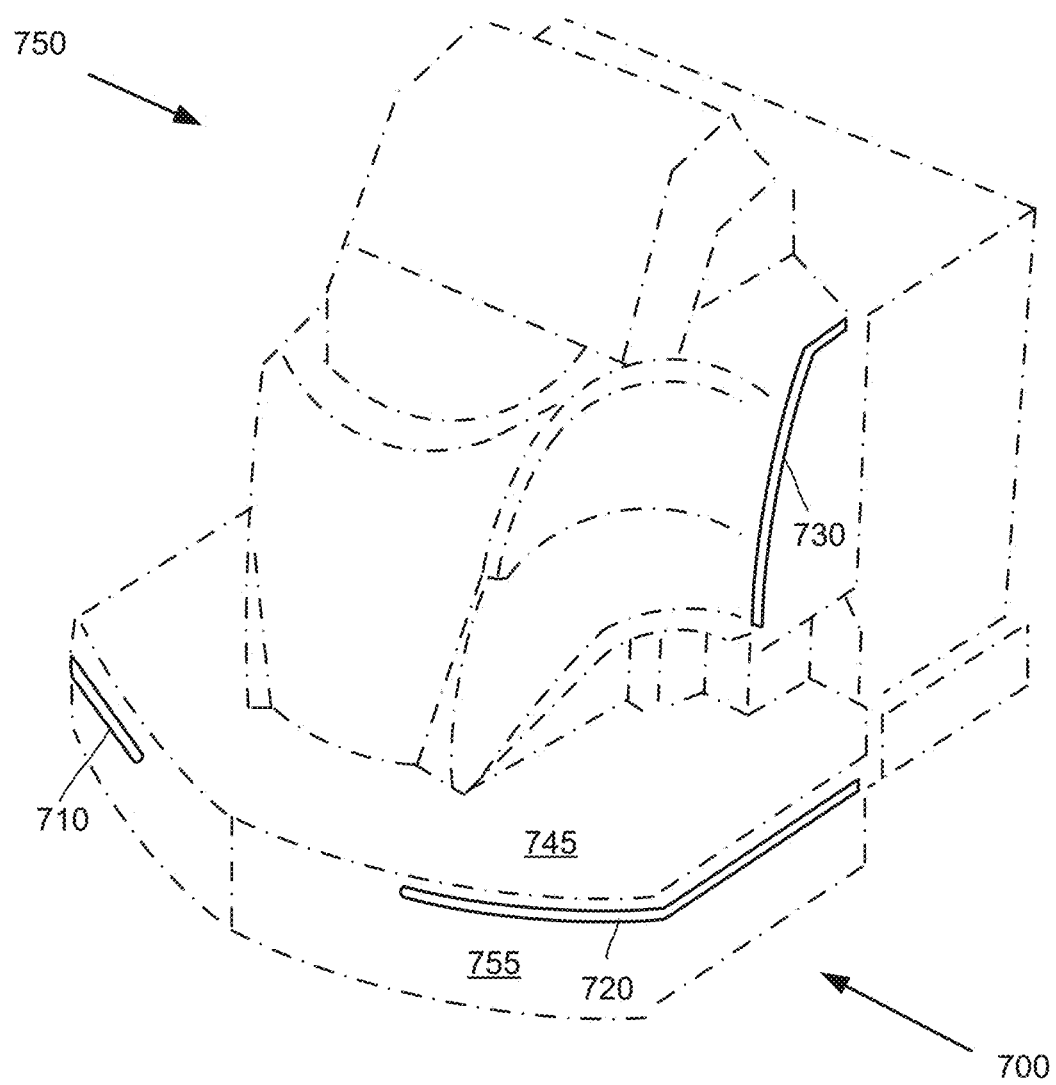

FIG. 17A illustrates a perspective view of another example operator awareness system 700. FIG. 17B is provided to highlight the relative position of operator awareness system 700 relative to vehicle 750 (partially shown in dashed environmental lines). System 700 may comprise a first light emitting device 710 and a second light emitting device 720, similarly located on a vehicle 750 as first light emitting device 610 and second light emitting device 620, respectively, illustrated in FIG. 16A.

One or both of first light emitting device 710 and second light emitting device 720 may be recessed and protected by a vehicle bumper 755 and/or floor mat 745 of the vehicle 750 while still being visible from the sides and/or end of vehicle 750. Additionally, one or more light emitting devices, such as light emitting device 730, may be used to illuminate a portion of the vehicle frame such as a "sail plate." In addition to the location of the operator platform 740, operator awareness system 700 may provide the operator with additional visual clues about the overall location and placement of one or more portions of the frame, a vehicle control, other features of vehicle 750, or any combination therefore. This may further facilitate operator ingress and egress from the vehicle 750 and when operating the vehicle 750.

Additionally, a steering control 760 may comprise one or more sensors which indicate a right turn or a left turn of vehicle 750. System 700 may be configured to detect the right turn and left turn, and then illuminate one or the other of first light emitting device 710 and second light emitting device 720 to indicate that vehicle 750 is in the process of turning, similar to an automotive turn signal. In some examples, first light emitting device 710 or second light emitting device 720 may flash during the turning operation.

Figure 18A:
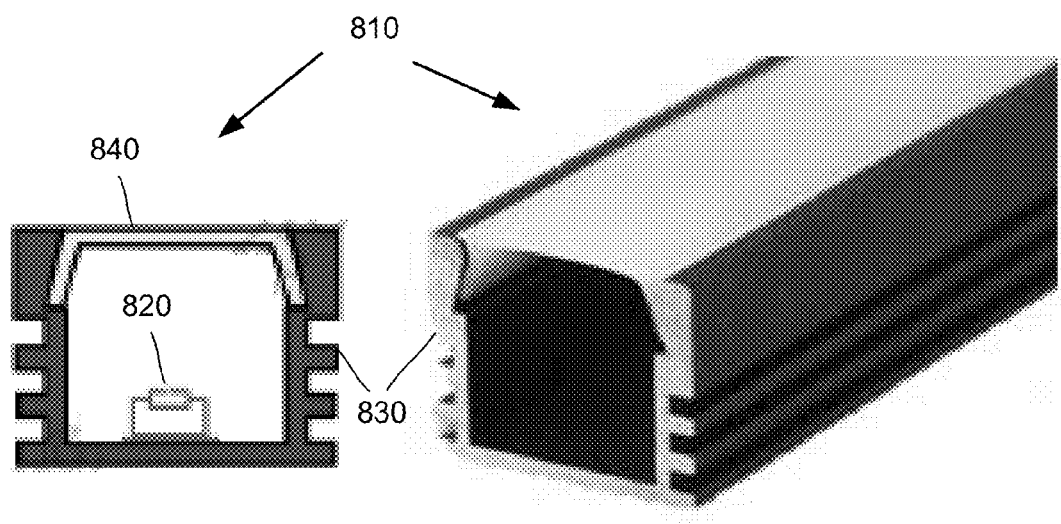
FIGS. 18A-18B illustrate example lighting devices configured as LED strip lights.

FIG. 18A illustrates an example lighting device 810 configured as a LED strip light. The lighting device 810 may comprise a plurality of LEDs 820 housed in an anodized aluminum channel 830. Channel 820 may be configured to protect LEDs 820 and provide overall durability to lighting device 810, in additional to providing a finished appearance to lighting device 810.

Channel 830 may be configured to direct the light out of a cover 840. In some examples, cover 840 may be configured as a flat cover that extends between the side of channel 830. Channel 830 may be approximately one-half inch wide by one-half inch tall, and may be one or more feet in length.

Lighting device 810 may provide for an even distribution of light along the length of the lighting device and may use significantly less power than other types of lights, such as halogen based lighting systems. The light emitted from lighting device 810 may be controllably directed away from the vehicle to avoid lighting up the vehicle frame or other component to which lighting device 810 may be attached, and which may otherwise provide some amount of glare.

Figure 18B:
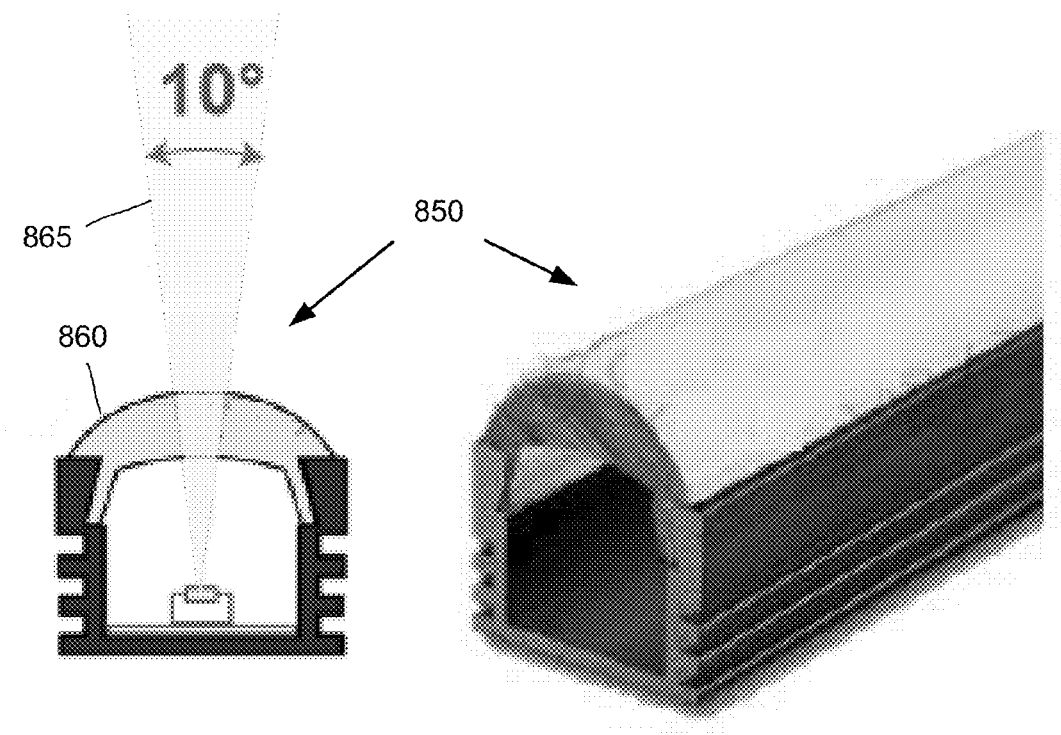

FIG. 18B illustrates another example lighting device 850 configured as a LED strip light. Lighting device 850 may be configured similarly as lighting device 810; however instead of including a flat cover, lighting device 850 may comprise a convex lens 860. By way of non-exhaustive example, lighting device 850 may be configured to emit light over an approximately ten-degree or more range of view 865.

One or more of the lighting devices 610, 620, 710, 720, and 730 variously illustrated in FIGS. 16A, 16B, 17A, and 17B may comprise on one or more LED strip lights similar to lighting device 810 and/or lighting device 850.

The systems and apparatuses described above may use dedicated processor systems, micro controllers, programmable logic devices, or microprocessors that perform some or all of the operations. Some or all of the operations described above may be implemented in software, hardware or a combination of both.

Additionally, while some of the examples have been illustrated or described with respect to providing functionality for a "walkie" or "rider" style pallet truck, some or all of the features may also be enabled for operation with other types of industrial vehicles including, but not limited to, reach trucks, three-wheel stand trucks, warehouse trucks, and counterbalanced trucks.

Having described and illustrated various examples herein, it should be apparent that other examples may be modified in arrangement and detail. We claim all modifications and variations coming within the spirit and scope of the following claims.

The invention claimed is:

1. A load handling system for a vehicle, comprising:
   a set of forks configured to concurrently support two or more pallets including a first pallet and a second pallet linearly positioned along a length of the forks;
   a lifting system configured to raise and lower the forks;
   a traction system configured to move the vehicle in a direction of travel associated with withdrawing the forks from the pallets; and
   a vehicle controller configured to place the vehicle in an automated mode of operation in response to receiving an activation signal, wherein during the automated mode of operation the vehicle controller is configured to:
   actuate the traction system a first time to move the vehicle in the direction of travel so that a front end of the forks moves from being under the second pallet to being under the first pallet;
   actuate the lifting system to raise the first pallet supported on the front end of the forks while the second pallet remains on a transport surface;
   actuate the traction system a second time to move the vehicle in the direction of travel so that the first pallet is spaced apart from the second pallet by a predetermined distance; and
   actuate the lifting system to lower the first pallet to the transport surface at the predetermined distance from the second pallet.

2. The load handling system of claim 1, further comprising one or more light emitting devices configured to provide a visual indication to non-operator pedestrians that the vehicle has been placed in the automated mode of operation.

3. The load handling system of claim 1, wherein during the automated load handling operation the vehicle controller is further configured to actuate the traction system a third time to move the vehicle in the direction of travel so that the front end of the forks is completely removed from both the first pallet and the second pallet.

4. The load handling system of claim 3, wherein the predetermined distance provides sufficient clearance for the operator to walk between the first pallet and the second pallet, and wherein the vehicle is moved in the direction of travel by a second instance of the predetermined distance when the traction system is actuated the third time.

5. The load handling system of claim 1, further comprising one or more sensors configured to detect a presence of one or both of the first pallet and the second pallet and to generate a pallet presence signal, wherein the vehicle controller is configured to perform at least a portion of the automated load handling operation in response to receiving both the pallet presence signal and the activation signal.

6. The load handling system of claim 5, wherein the one or more sensors are configured to detect when the end of the forks has been withdrawn from the second pallet.

7. The load handling system of claim 5, wherein the one or more sensors are configured to detect when the first pallet is located on a back end of the forks and when the second pallet is located on the front end of the forks.

8. The load handling system of claim 1, further comprising one or more sensors configured to monitor for an obstacle located proximate to the vehicle and to generate a proximity alert in response to detecting the obstacle, wherein the vehicle controller is configured to disable the automated load handling operation in response to detecting the obstacle.

9. The load handling system of claim 8, wherein the vehicle controller is configured to disable the automated load handling operation in response to detecting that a distance to the obstacle is less than a total distance required by the vehicle to move in the direction of travel to both withdraw the forks from the second pallet and space apart the first pallet from the second pallet by the predetermined distance.

10. The load handling system of claim 9, wherein the total distance required to both withdraw the forks from the second pallet and space apart the first pallet from the second pallet is approximately two meters.

11. A method of performing a load handling operation for a vehicle having a set of forks configured to concurrently support both a first pallet and a second pallet linearly positioned along a length of the forks, a lifting system configured to raise and lower the forks, and a traction system configured to move the vehicle in a direction of travel associated with withdrawing the forks from pallets, the method comprising:
   receiving, by a vehicle controller, an activation signal;
   placing the vehicle in an automated mode of operation based, at least in part, on the activation signal;
   actuating, by the vehicle controller, the traction system to move the vehicle in the direction of travel during the automated mode of operation, so that a front end of the forks moves from being under the second pallet to being under the first pallet;
   actuating, by the vehicle controller, the lifting system to raise the first pallet supported on the front end of the forks during the automated mode of operation, while the second pallet remains on a transport surface;
   actuating, by the vehicle controller, the traction system to move the vehicle in the direction of travel during the automated mode of operation, so that the first pallet is spaced apart from the second pallet by a predetermined distance; and
   actuating, by the vehicle controller, the lifting system during the automated mode of operation, to lower the first pallet to the transport surface at the predetermined distance from the second pallet.

12. The method of claim 11, further comprising receiving, by the vehicle controller, a pallet presence signal from one or more sensors located within the forks, wherein the vehicle is placed in the automated mode of operation based, at least in part, on both the pallet presence signal and the activation signal.

13. The method of claim 11, further comprising controlling, by the vehicle controller, one or more light emitting devices mounted on the vehicle to provide a visual indication that the vehicle has been placed in the automated mode of operation.

14. The method of claim 11, wherein the one or more light emitting devices emit a first light characteristic when the vehicle is being manually operated, and wherein the one or more light emitting devices are controlled to emit a second light characteristic when the vehicle has been placed in the automated mode of operation.

15. The method of claim 11, further comprising receiving, by the vehicle controller, an obstacle monitoring signal from one or more sensors located on the vehicle, wherein the vehicle is placed in the automated mode of operation based, at least in part, on a determination that there are no immediate obstacles in the direction of travel.

16. The method of claim 15, further comprising determining a distance to the nearest obstacle based on the obstacle monitoring signal, wherein the vehicle is placed in the automated mode of operation based, at least in part, on a determination that the distance to the nearest obstacle is less than a total distance that the vehicle is required to move in the direction of travel while performing the load handling operation.

17. The method of claim 11, further comprises actuating the traction system to move the vehicle in the direction of travel so that the front end of the forks is completely removed from both the first pallet and the second pallet.

18. The method of claim 17, wherein the predetermined distance provides sufficient clearance for the operator to walk between the first pallet and the second pallet, and wherein the vehicle is moved in the direction of travel by a second instance of the predetermined distance when the traction system is actuated the third time.

19. The method of claim 11, wherein the traction system is further configured to move the vehicle in a second direction of travel associated with inserting the forks into pallets, the method further comprising:
receiving, by a vehicle controller, a second activation signal after the first pallet has been lowered to the transport surface at the predetermined distance from the second pallet;
actuating, by the vehicle controller, the lifting system to raise the first pallet supported on the end of the forks from the transport surface during a second automated mode of operation, wherein the first pallet is laterally spaced apart from the second pallet by the predetermined distance;
actuating, by the vehicle controller, the traction system to move the vehicle in the second direction of travel during the second automated mode of operation, so that the first pallet is moved towards the second pallet by the predetermined distance; and
actuating, by the vehicle controller, the lifting system to lower the first pallet to the transport surface during the second automated mode of operation, so that the first pallet is located next to the second pallet on the transport surface; and
actuating, by a vehicle controller, the traction system to move the vehicle in the second direction of travel during the second automated mode of operation, so that the front end of the forks moves from being under the first pallet to being under the second pallet.

20. The method of claim 19, further comprising:
receiving, by the vehicle controller, a pallet presence signal indicating that one or both of the first pallet and the second pallet are located above the forks during the second automated mode of operation;
actuating, by the vehicle controller, the lifting system to raise the forks to a maximum lift height during the second automated mode of operation, in response to receiving the pallet presence signal; and
placing the vehicle in a manual mode of operation after the forks have been raised to the maximum lift height.

* * * * *